United States Patent [19]
Tyson, Jr. et al.

[11] 3,834,544
[45] Sept. 10, 1974

[54] MEMBRANE DIFFUSION APPARATUS

[75] Inventors: William H. Tyson, Jr., Moraga; Mogens L. Bramson, San Francisco, both of Calif.

[73] Assignee: Cutter Laboratories Inc., Berkeley, Calif.

[22] Filed: July 6, 1971

[21] Appl. No.: 159,589

[52] U.S. Cl. .............................. 210/321, 23/258.5
[51] Int. Cl. ........................................ B01d 31/00
[58] Field of Search ................... 210/321; 23/258.5; 204/301; 55/158; 159/DIG. 27

[56] References Cited
UNITED STATES PATENTS

| | | | |
|---|---|---|---|
| 3,074,559 | 1/1963 | Savino | 210/321 |
| 3,212,498 | 10/1965 | McKirpy et al. | 128/214 |
| 3,219,573 | 11/1965 | Chen et al. | 210/321 X |
| 3,398,091 | 8/1968 | Greatorex | 210/321 X |
| 3,405,047 | 10/1965 | Chen | 204/301 X |
| 3,412,006 | 11/1968 | Alexander et al. | 204/301 X |
| 3,413,095 | 11/1968 | Bramson | 23/258.5 |
| 3,520,803 | 7/1970 | Iaconelli | 210/23 |
| 3,631,986 | 1/1972 | Sausse | 210/321 |

*Primary Examiner*—Frank A. Spear, Jr.
*Attorney, Agent, or Firm*—Owen, Wickersham & Erickson

[57] ABSTRACT

Membrane diffusion apparatus for use as a blood oxygenator, dialyzer, or for general diffusion or heat transfer purposes.

One example is a disposable blood oxygenator comprising a plurality of frames, membranes, and screens which when stacked and clamped together, form cells for a three-fluid system, blood oxygen, and water. Each fluid has frames and membranes, some of which may have shaped identical to those for another fluid, and the frames and membranes are provided with manifold slots for the independent uniform distribution of each fluid to and from its respective fluid system. Similar structures may be used in a three-fluid dialyzer, while a four-fluid system for both oxygenating and dialyzing may employ the same basic principles.

38 Claims, 24 Drawing Figures

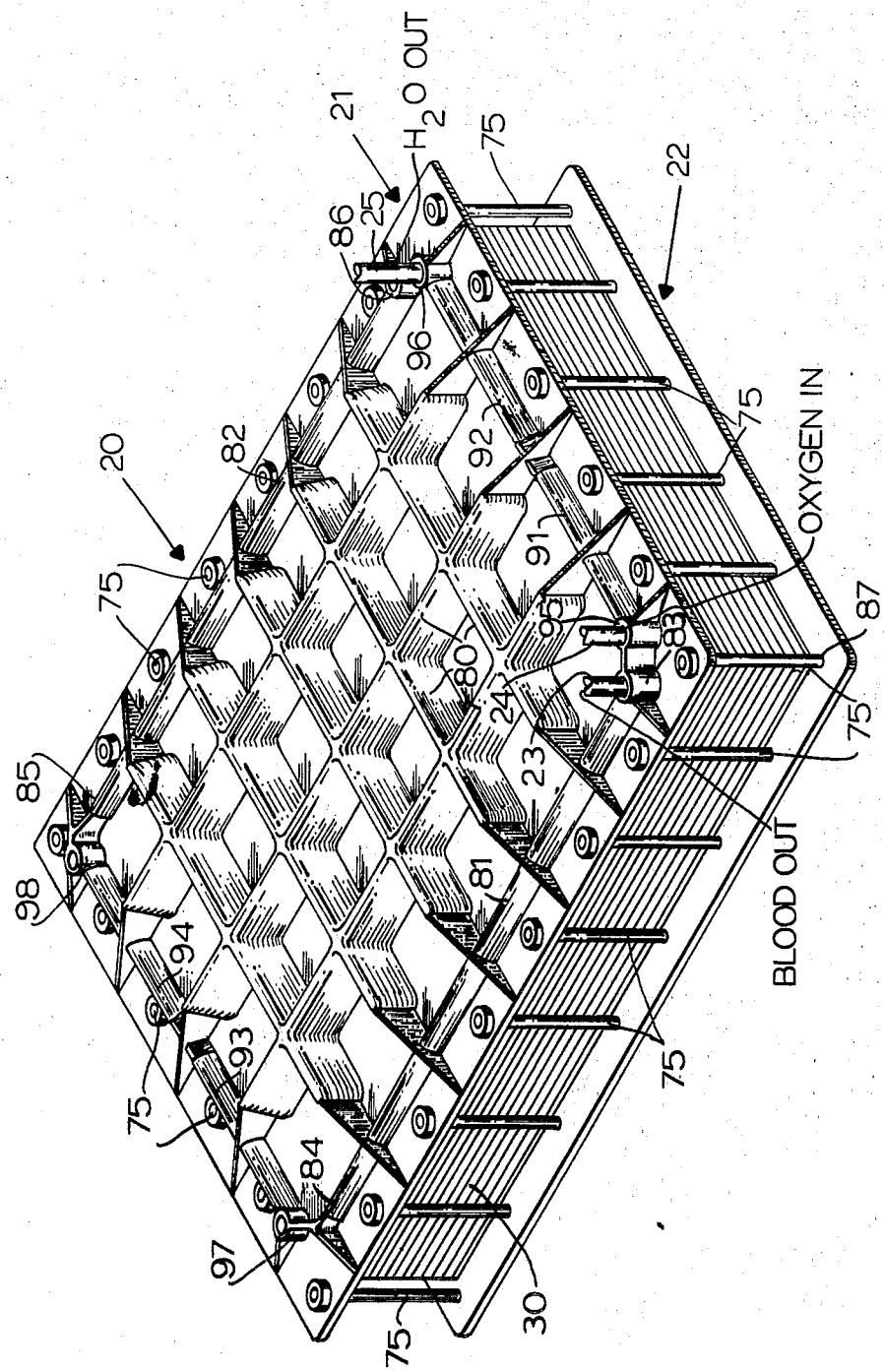

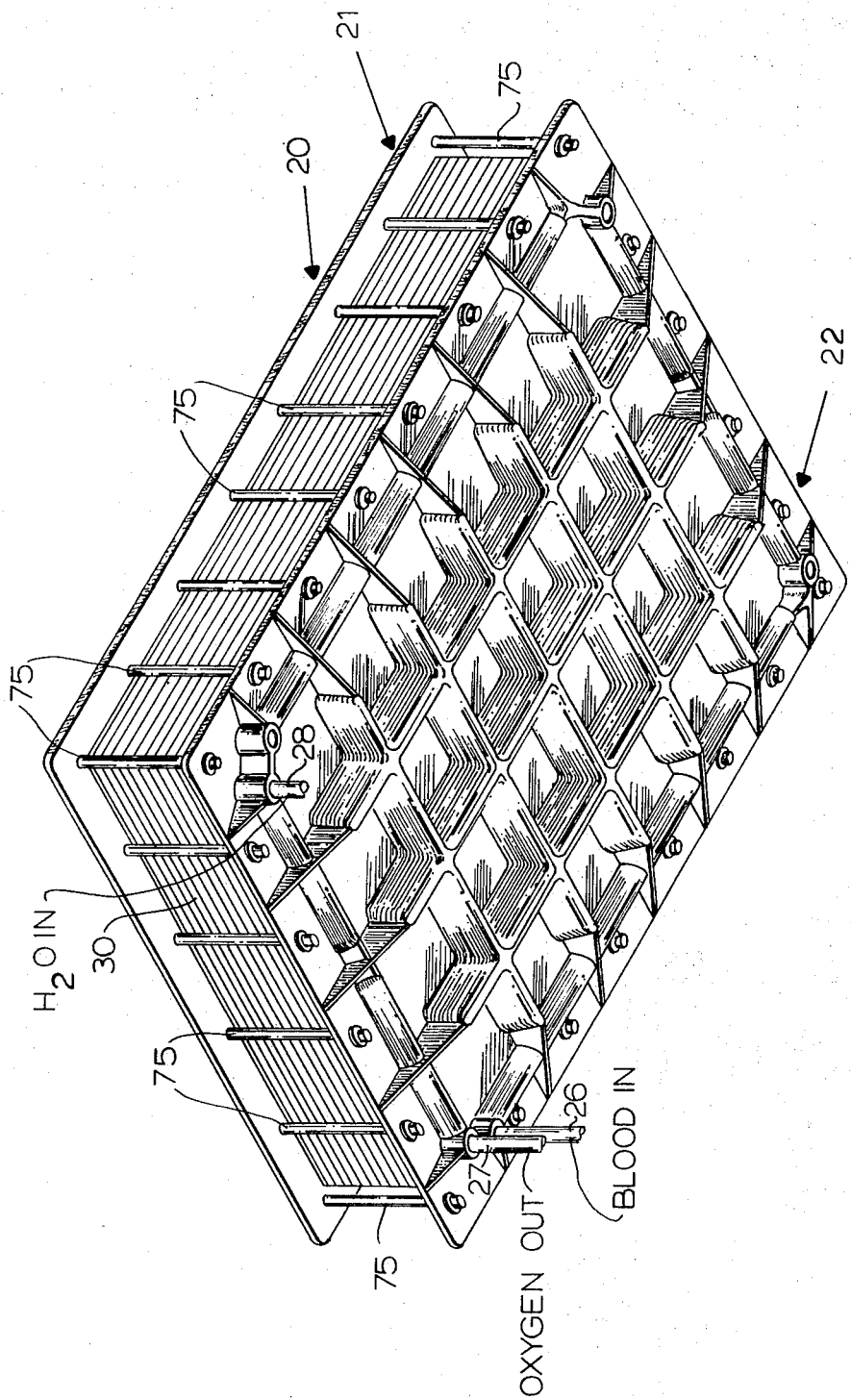
FIG. 1-A

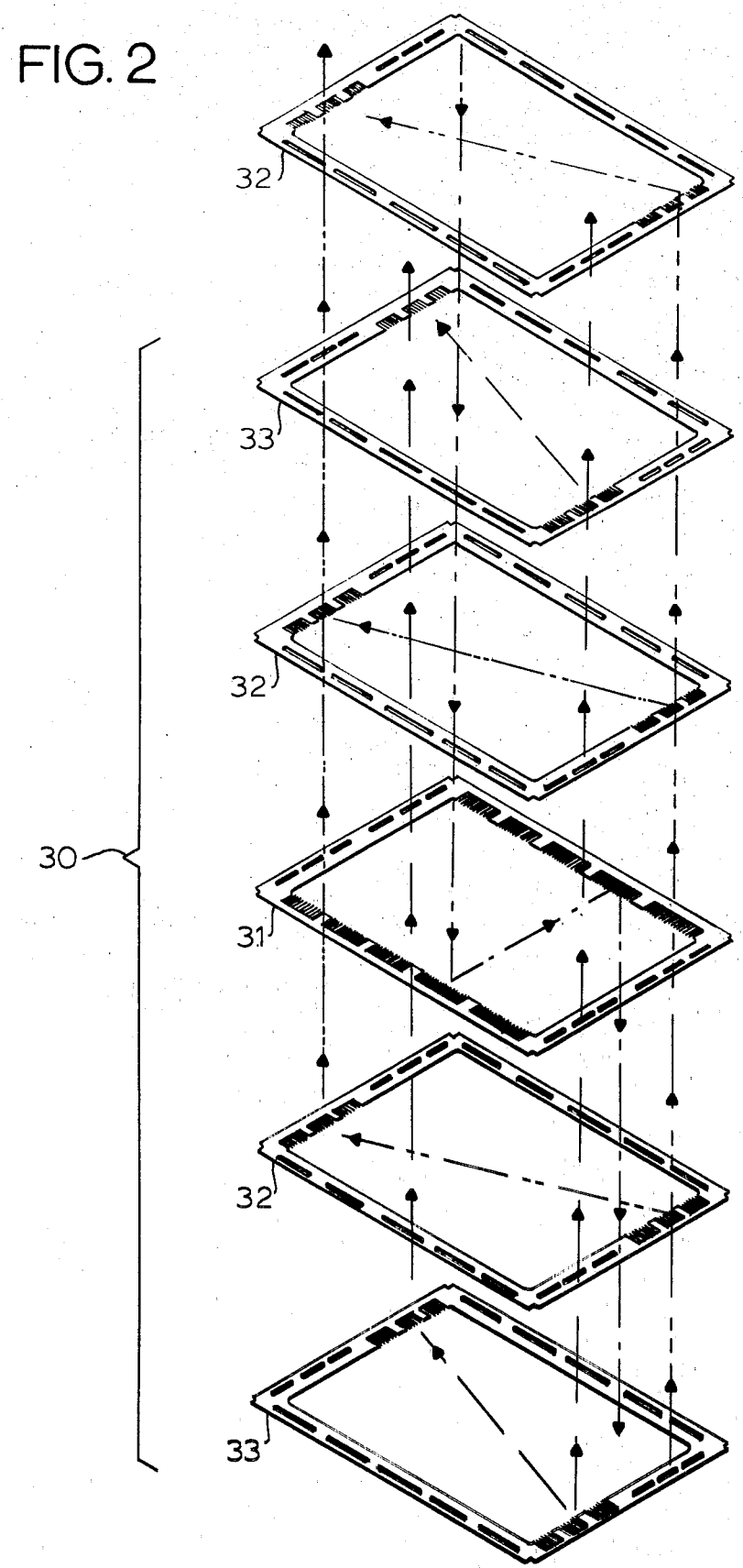

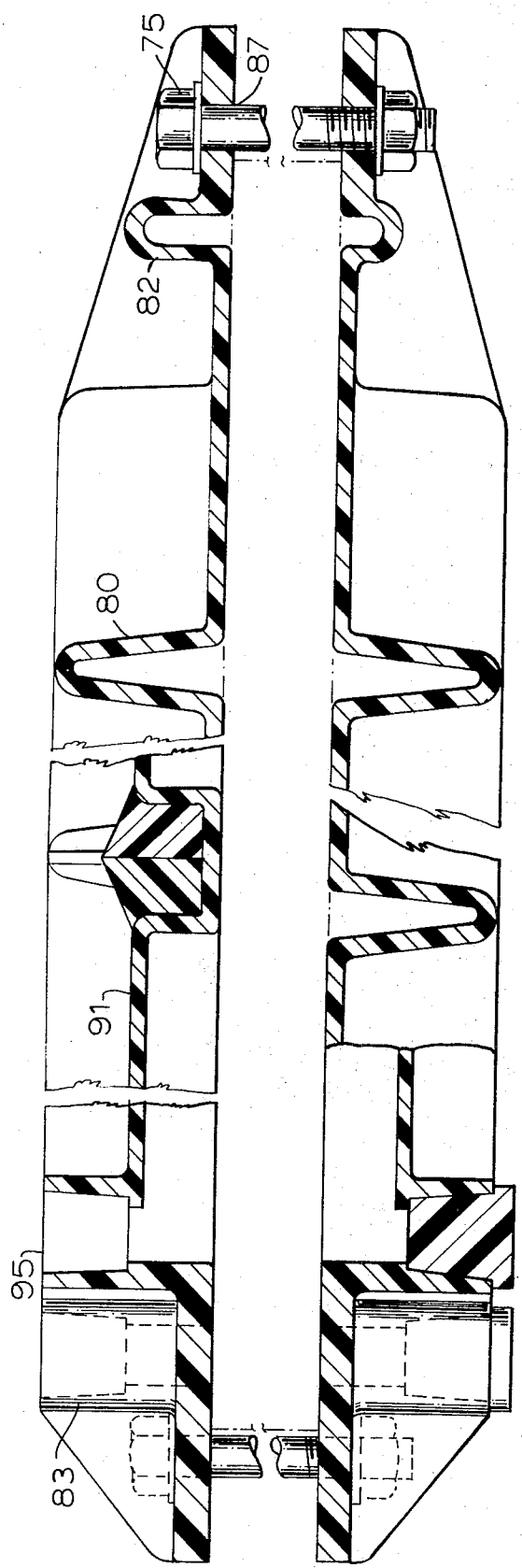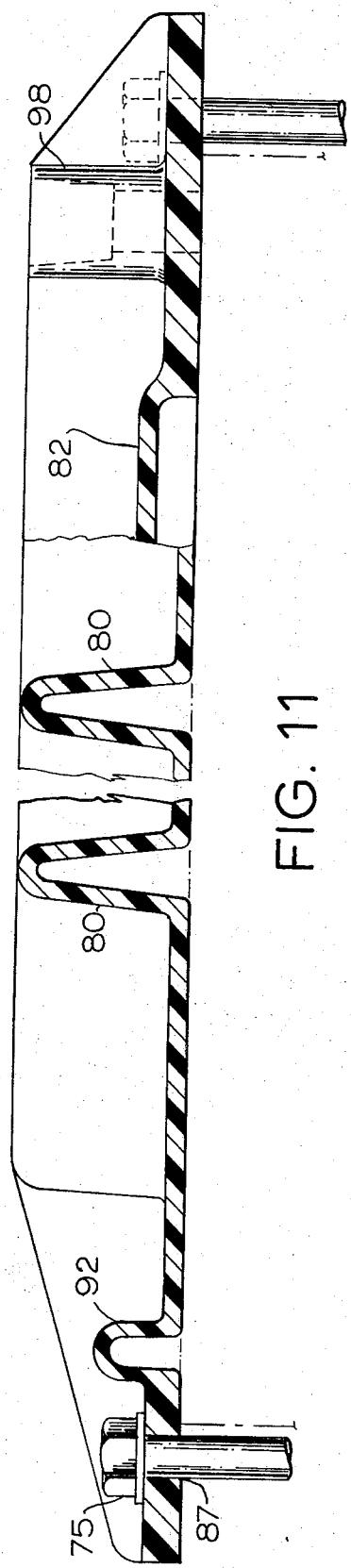
FIG. 10
FIG. 11

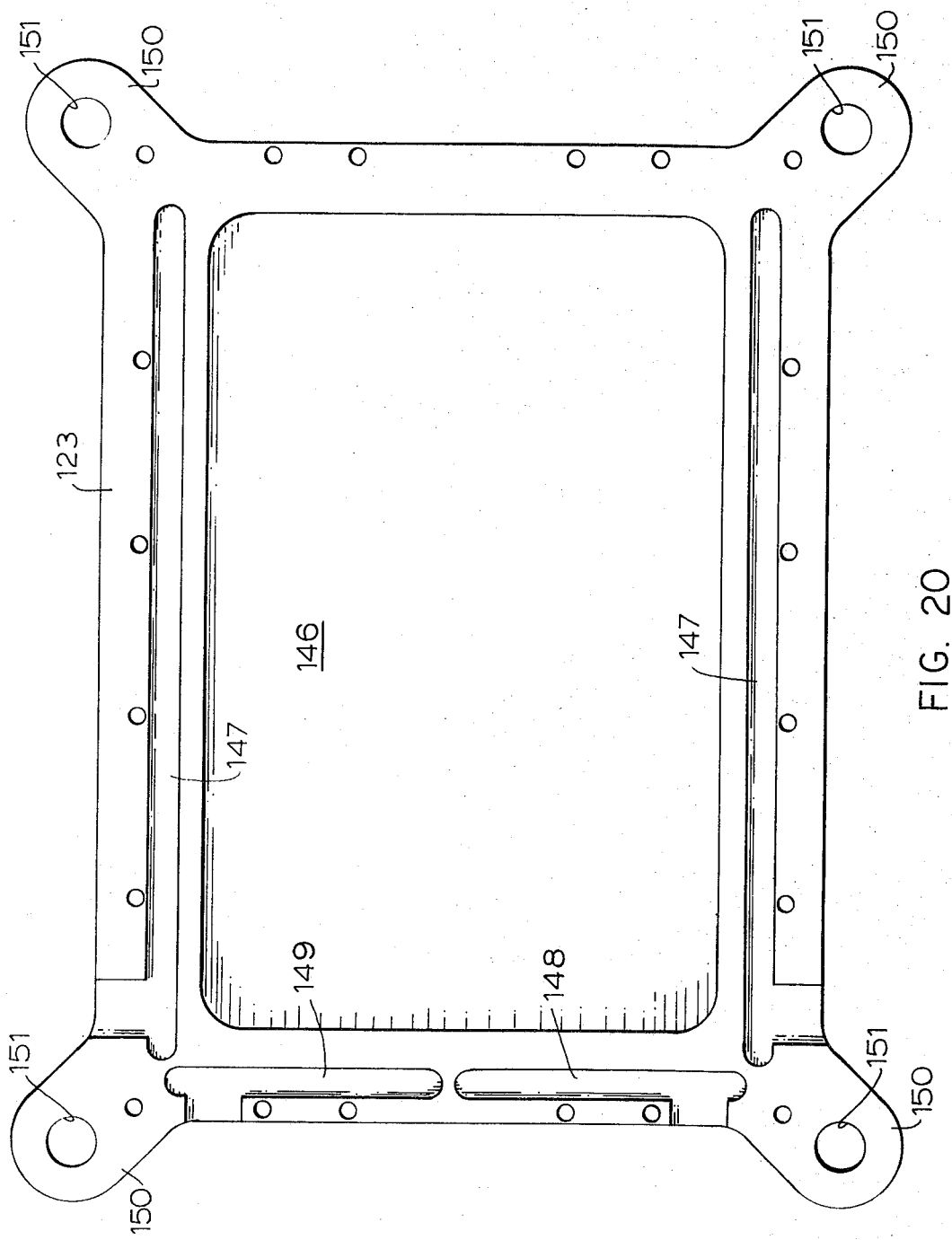

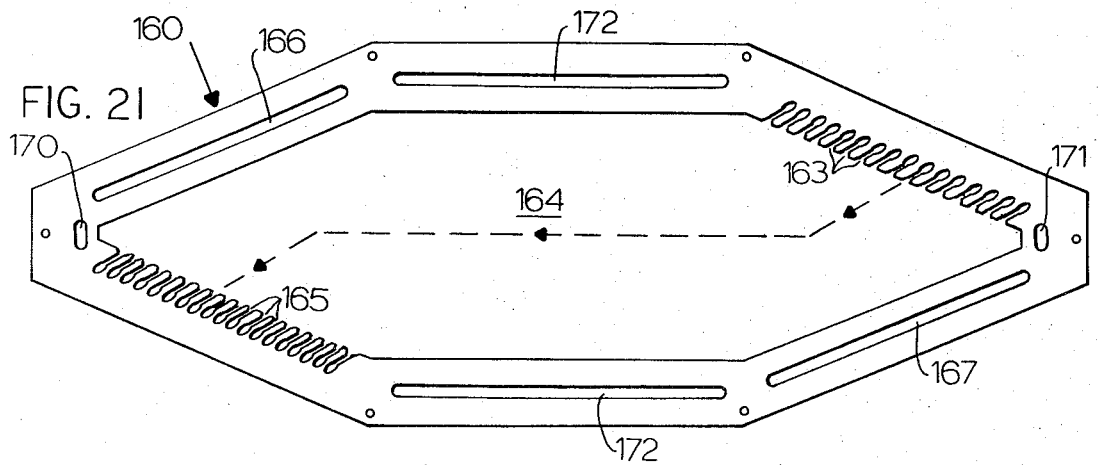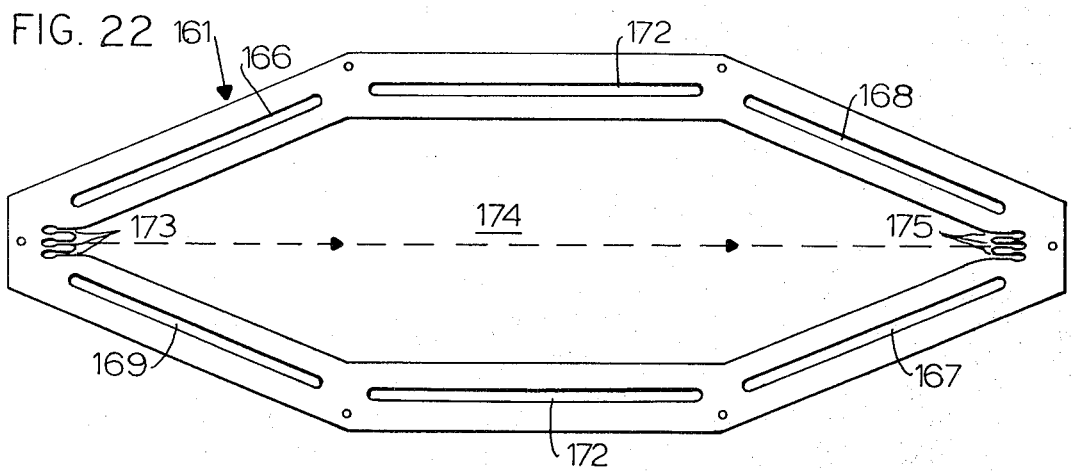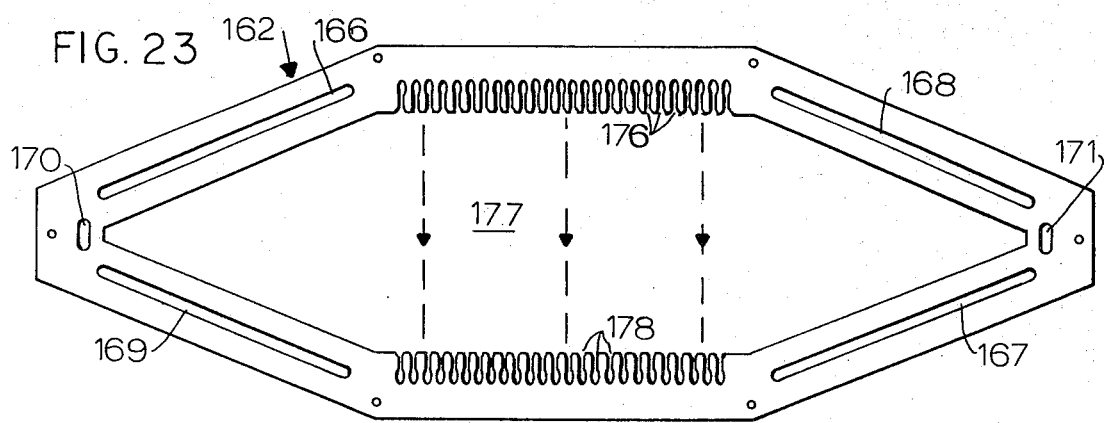

MEMBRANE DIFFUSION APPARATUS

BACKGROUND OF THE INVENTION

This invention relates to improvements in disposable membrane diffusion devices. One such device is an improved membrane oxygenator for supplying oxygen to blood and for removing carbon dioxide therefrom. This invention also relates to a membrane diffusion apparatus for dialysis and for heat exchange.

When a patient's heart and lungs are out of action during open-heart surgery, or when either is impaired due to disease or trauma, he can be kept alive only if the heart and lung functions are taken over by a machine which can arterialize his blood and circulate it throughout his body. During the 16 years in which open-heart surgery has been possible through the development of heart-lung machines, evidence has been mounting that oxygenators of the blood bubbling or filming type, which rely on gas exchange by direct blood-gas contact, damage the blood and the patient more than does the membrane type of oxygenator in which such direct contact is avoided. Furthermore, oxygenators of the direct blood-gas contact type, because of this damage, cannot be used for more than a few hours. Since prolonged use is proving to be increasingly important, the demonstrated ability of membrane oxygenators to support critically ill patients for longer periods — days instead of hours — has led to increased efforts to improve their designs.

Experience to date has shown that membrane oxygenators should meet the following criteria: They should (1) provide maximal specific gas transfer rates, (2) minimize trauma to the blood, (3) require minimal priming volumes, (4) minimize variations in blood volumes within the device caused by variations in pressure or flow of blood from the patient, (5) operate with gas pressures always lower than blood pressures, (6) be constructed so as to make practicable the complete elimination of air from the blood circuit during priming, and (7) include, if possible, heat transfer capabilities without additional priming volume or blood contact surfaces.

The design of a membrane oxygenator as disclosed in U.S. Pat. No. 3,413,095 was based on the above criteria. That oxygenator, although fulfilling most of these objectives, still suffered certain deficiencies which it is a purpose of the present invention to eliminate. For example, it did not provide for uniform blood flow over the membranes, thus causing uneven utilization of the available gas exchange surfaces; priming volumes were larger than desirable; air elimination from the blood circuit during priming was time-consuming; and the device was expensive to manufacture, hence was nondisposable and required complex processing between uses.

Other membrane oxygenators more recently disclosed still fail to meet all of the above criteria, despite the incorporation of certain useful elements used in the device revealed in U.S. Pat. No. 3,413,095. for example, the oxygenators described in U.S. Pat. Nos. 3,564,819 and 3,560,340 have flow geometries which do not provide equal lengths of blood flow paths for all stream lines between the points of entry to and exit from the device. This deficiency gives rise to areas of reduced mass transfer efficiency. This deficiency is also characteristic of other current art. To maximize specific gas transfer rates across the membranes, it is essential that all stream lines of blood be of equal length and that the blood flow over the membrane surface in a gently turbulent manner.

Some other membrane oxygenators also fail to meet another of the criteria stated above, for they fail to maintain essentially constant blood volume notwithstanding wide variations in blood flow and pressure. Yet constant extracorporeal blood volume greatly simplifies the management of a membrane oxygenator during use.

SUMMARY OF THE INVENTION

The present invention comprises a stack of cells, preferably but not necessarily rectangular, to accommodate three or more independent fluid circuits in a disposable membrane diffusion device. For example, one fluid may be blood, another oxygen, and the third water. Or the fluids may be blood, dialysate, and water. Or there may be four fluids: e.g., blood, oxygen, dialysate, and water. In any event, there is a cell for each fluid. The cells are enclosed by two end pressure plates provided with manifold conduits. In the stack, frames are interspersed with membranes.

When the device is used as an artificial lung, fluids are blood, oxygen and water. Then, each blood cell comprises a flat frame assembly with a gas diffusion membrane on either side and a screen lying in the space between the membranes. Each oxygen cell comprises a flat frame assembly with a screen lying within the frame assembly, and each water cell comprises a flat frame assembly with a water impermeable membrane on either side. These cells, frames, and membranes may be rectangular, hexagonal, octagonal, circular or other shapes. In a rectangular system, all frame assemblies and all membranes have along each side of the rectangle a number of long, narrow slots occupying approximately one eighth of the frame width. The location of these slots is identical in all of the frame assemblies and membranes.

The cells are stacked upon each other in accurate alignment, so that the slots form vertical passages from the top to the bottom of the stack, and these vertical passages form part of the three fluid manifold system. To ensure accuracy, thin rods preferably penetrate the stack at such intervals around the periphery as to prevent local misalignments. The stacking order is: water cell, oxygen cell, blood cell, oxygen cell, water cell, oxygen cell, etc., with water cells at each end of the stack. Thus each blood cell lies between a pair of oxygen cells, which, in turn, are blanketed by water cells or mattresses.

The stack is held and pressed together by the two end pressure plates, which contain entry and exit ports, as well as inlet and outlet recesses, preferably tapered, for each of the three fluids, and these recesses coincide with and communicate with the respective appropriate vertical passages through the stack.

In a rectangular system, the two long sides of the rectangle are used for the blood manifolding. To provide access from the vertical passages into all the blood cells a multiplicity of small, horizontal, equidistant channels lying within the thickness of each blood frame is provided along the entire length of the blood manifold slots. These channels lie between the manifold slots and the two long inner edges of the blood frames, and their size, number, and shape in each frame are sufficient to provide negligible resistance to the blood flow into and out of that cell. Thus a blood flow path is provided, which may start at an inlet port in the bottom end pressure plate, then continues along the tapered recess and upward through the vertical inlet manifold passage. From there it has random access to all the blood cells through the multiple horizontal channels in each blood frame. Egress from each blood cell follows a similar but converse sequence to an exit port which may be in the upper end pressure plate. The two short sides of the rectangle are used similarly for the oxygen and water circuits, except that each fluid uses only half of the length of each of these sides, inlet and outlet manifolds for each fluid occupying diagonally opposite segments of the frames.

The stack can contain any number of blood cells, and it constitutes a disposable cartridge which, for use, is placed in a pressuring jig with sufficient clamping power to create tight joints in all contact surfaces in the stack.

As noted before, screens are interposed within the open spaces of the frames of the blood and oxygen cells. Water in the mattresses exerts pressure via the oxygen cell screens on the membranes of the blood cells, thereby defining a constant and uniform thickness of the blood path. The blood cell screens provide uniform resistance as well as mild turbulence to enhance oxygen and carbon dioxide transfer efficiency without causing significant hemolysis.

Each fluid thus flows independently through its own vertical passageway which is formed by the stack of cells. The center frame of each cell has ingress and egress channels in communication with the manifold slots which enable each fluid to flow uniformly into and from its respective cell. The manifold system, in combination with the arrangement of inlet and outlet ports, assures streamlines of equal length for the blood.

The general object of the present invention is to provide an improved membrane fluid diffusion exchange device. More specific objects include: increasing specific gas transfer rates, accomplishing uniform blood flow distribution, minimizing total membrane diffusion area, maintaining constant blood volume, providing equal blood flow through all blood cells, providing only a small priming volume, making practicable the elimination of air from the blood circuit during priming, minimizing trauma to the blood, providing integral heat transfer capability, providing wide flexibility of capacity for prolonged use without the necessity for using additionally different parts. The invention provides a device which is less complicated and less expensive to manufacture from a minimum of different inexpensive parts, hence in comparison with comparable prior devices, provides a device which is economically disposable, so that after use on one patient the troubles of cleaning and resterilizing are avoided without endangering the next patient.

The invention will be better understood, and its advantages will become apparent with reference to the following detailed description of some preferred embodiments. Although a blood oxygenator is illustrated by way of example, it is understood that the principles of this invention are also applicable to dialysis and for other purposes involving membrane diffusion exchange between two, three, or more fluids.

BRIEF DESCRIPTION OF THE DRAWINGS

In the drawings:

FIG. 1 is a isometric view of a complete membrane lung assembly embodying the principles of the invention.

FIG. 1A is a similar view of the assembly of FIG. 1 looking at the opposite end.

FIG. 2 is an exploded isometric view of a small portion of the stack of FIG. 1, showing a series of portions of cells representing one unit, plus part of the next unit, there being many such units. Fluid-flow patterns are shown.

FIG. 10 is a view taken along the line 10—10 in FIG. 9.

FIG. 11 is a view taken along the line 11—11 in FIG. 9.

FIG. 20 is a plan view of one of the metal end plates of FIG. 17.

FIG. 21 is a top plan view of another modified form of frame member, on octagonal frame used in one position in the cell for blood and, inverted, for dialysate.

FIG. 22 is a top plan view of an octagonal frame member used with that of FIG. 21 for the oxygen cell.

FIG. 23 is a top plan view of an octagonal frame member used with those of FIGS. 21 and 22 for the water cell.

DESCRIPTION OF PREFERRED EMBODIMENTS

Figure 3:
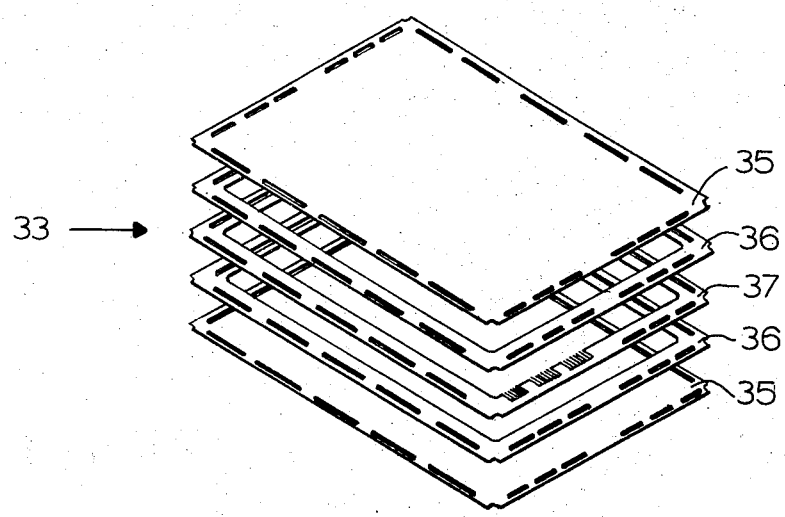
FIG. 3 is a partially exploded isometric view of a water cell, a portion of which is shown twice in FIG. 2.

A rectangular blood oxygenator (FIGS. 1–11 and 14–16)

FIG. 1 shows an assembly 20 embodying the principles of the invention, somewhat reduced in size. The assembly 20 comprises two manifold pressure plates 21 and 22, one at each end. These manifold pressure plates 21 and 22 are identical in manufacture, but in adaptation are employed somewhat differently, as will be seen. The manifold pressure plate 21 has a blood outlet 23, an oxygen inlet 24, and a water outlet 25, while the manifold pressure plate 22 has a blood inlet 26, an oxygen inlet 27, and a water inlet 28. Between these two manifold pressure plates 21 and 22, numerous units 30 are stacked. These comprise generally fifteen units 30, each one of which comprises a blood cell 31 between two oxygen cells 32, with these three members sandwiched between two water cells 33. However, the water cell 33 at the end of one unit 30 is also the water cell at the beginning of the next unit 30; so in 15 units 30 there will be 16 water cells 33, 30 oxygen cells 32, and 15 blood cells 31. FIG. 2 shows basically the order of assembly, although the view shows only the center frame member of each cell for convenience of illustration, the stack being continued indefinitely in the pattern; water cell 33, oxygen cell 32, blood cell 31, oxygen cell 32, water cell 33, oxygen cell 32, blood cell 31, oxygen cell 32, water cell 33, and so on.

A water cell or mattress 33 is shown in an exploded view in FIG. 3, which shows that it comprises two identical water cell membranes or closure means 35, one at each end, two identical spacer frames 36, each next to a membrane 35 and each on opposite sides of a water frame 37. Basically, what this means is that the three frames, the two spacer frames 36 and the water frame 37, are provided to space apart the two water cell membranes 35 which close the ends of each cell 33, so that when water is put into the cell 33, water pressure is exerted against each membrane 35, and this is used to obtain the desired pressure for establishing fixed clearances within the oxygen and blood cell spaces. The water circulating through the mattresses may be externally heated or cooled to provide thermal control of the blood in the blood cells.

Figure 4:
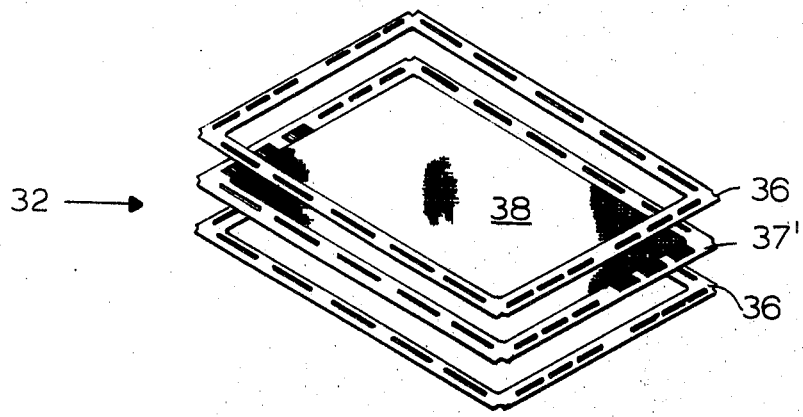
FIG. 4 is a partially exploded isometric view of an oxygen cell, a portion of which is shown three times in FIG. 2.

The oxygen cell 32, shown in FIG. 4, in exploded view, comprises two spacer frames 36, one at each end, between which lie an oxygen frame 37' and one or more foraminous spacing elements or screens 38. An important feature of this invention is that the spacer frames 36 of all cells 31, 32, and 33 are identical. Also, the oxygen frame 37' and the water frame 37 are identical, except that in the oxygen cell the frame 37 is turned over to make it a frame 37'; and it is used differently, as will be seen.

Figure 5:
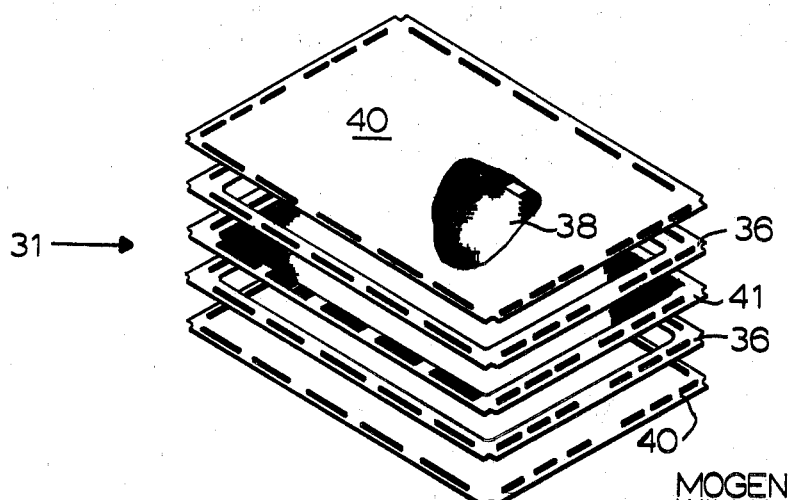
FIG. 5 is an exploded isometric view of a blood cell, a portion of which is shown once in FIG. 2.

FIG. 5 shows a blood cell 31 of the invention in an exploded form, and it will be seen that each cell 31 comprises a blood cell membrane 40 at each end, with two spacer frames 36, one next to each membrane 40 and a blood frame 41 in between the two spacer frames 36, with one or more foraminous spacing elements or screens 38 inside that. The spacer frames 36 are identical with those used in the oxygen cell 32 and water cell 33, but the blood frame 41 is different from the oxygen or water frame 37. The screen 38 may be identical to that used in the oxygen cell.

Thus, in the above assembly the cells are arranged such that when the water mattresses 33 are filled with water under pressure, that pressure is exerted against the screens 38 in the oxygen cells 32, which in turn apply uniform pressure on the membranes 40; and with the screen 38 between these membranes in the blood cell 31, a fixed tortuous space is thereby formed through which the blood passes in a mildly turbulent fashion. Also, the thickness of the blood space is, by virtue of the uniformity of hydraulic pressure and the uniformity of the blood cell screen 38, the same in all blood cells. In this way, uniform flow resistance is developed within the blood space so that the blood travels in parallel streamlines of equal velocities from the inlet side to the outlet side of each blood cell. Further, the interior edges of the blood frames 41 are parallel to assure uniform flow paths. Flow through the water and oxygen spaces is also well distributed within the respective layers.

Thus, as far as the number of parts is concerned, there are actually the following parts:

1. Water cell membranes 35, of which two are used in each water cell 33, none are used elsewhere.
2. Spacer frames 36, of which two are used in each water cell 33, two in each blood cell 31, and two in each oxygen cell 32; all of these being identical.
3. A water frame 37 which is the same member as the oxygen frame 37' but is turned over when used as the oxygen frame 37'.
4. A blood frame 41, used only in the blood cell 31.
5. A blood cell membrane 40, of which two are used in the blood cell 31.
6. A screen 38, of which one or more is used in the oxygen cell 32 and one or more in the blood cell 31.
7. An end plate 21 (or 22), of which two are used.

Figure 6:
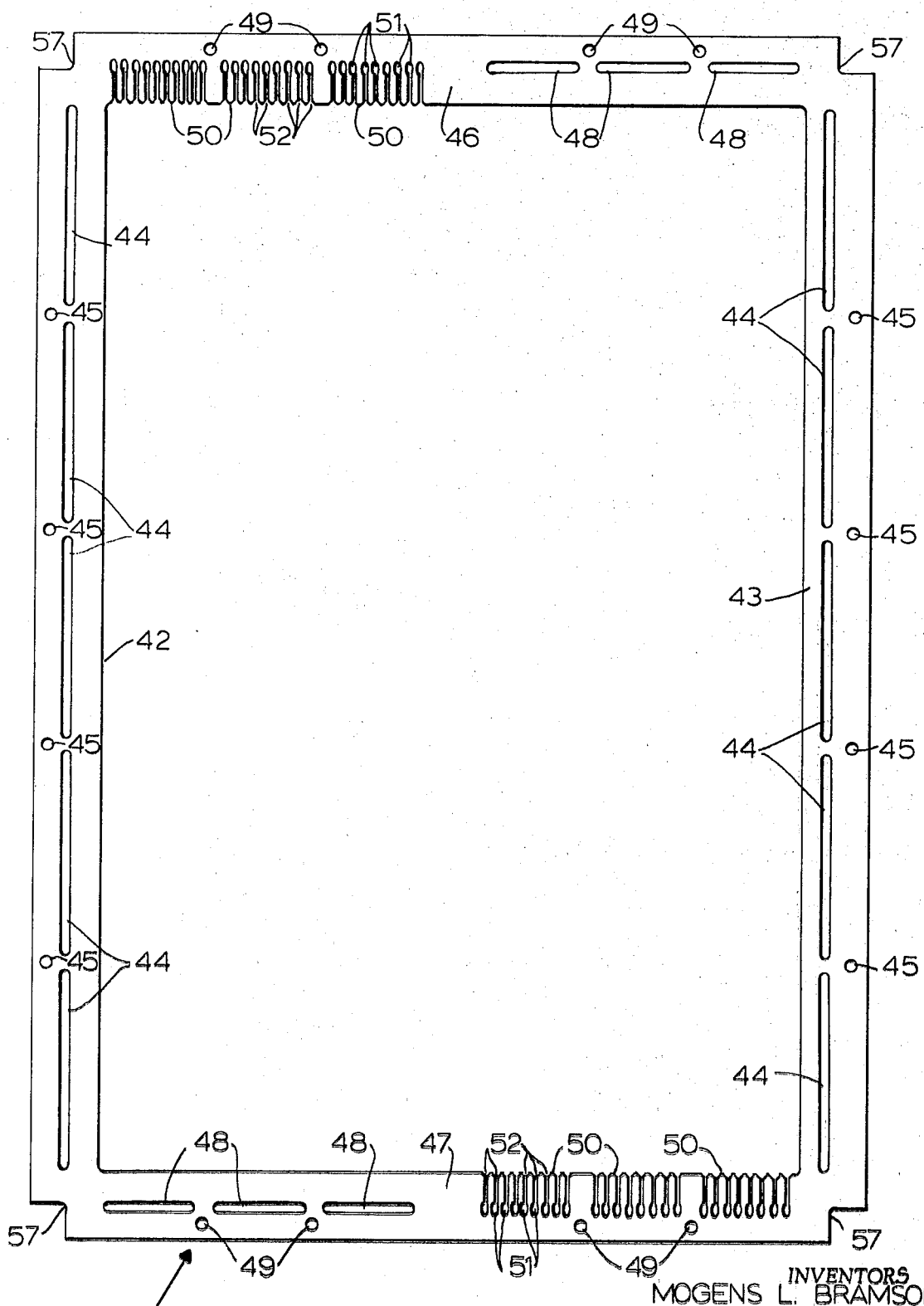
FIG. 6 is a top plan view of a frame member that is used in both the oxygen and water cells.
Figure 7:
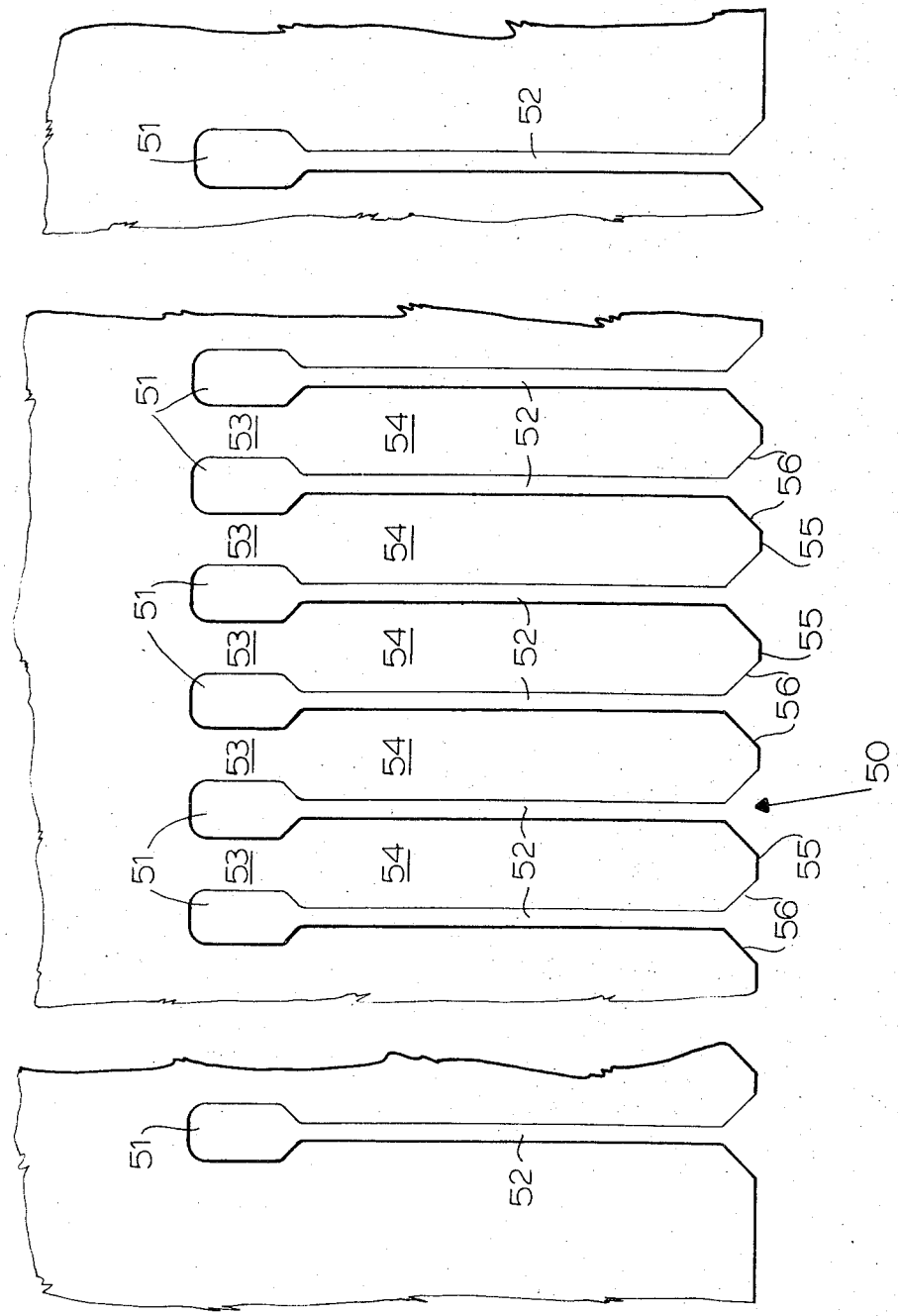
FIG. 7 is an enlarged view of a portion of FIG. 6, partly broken in order to conserve space.
Figure 8:
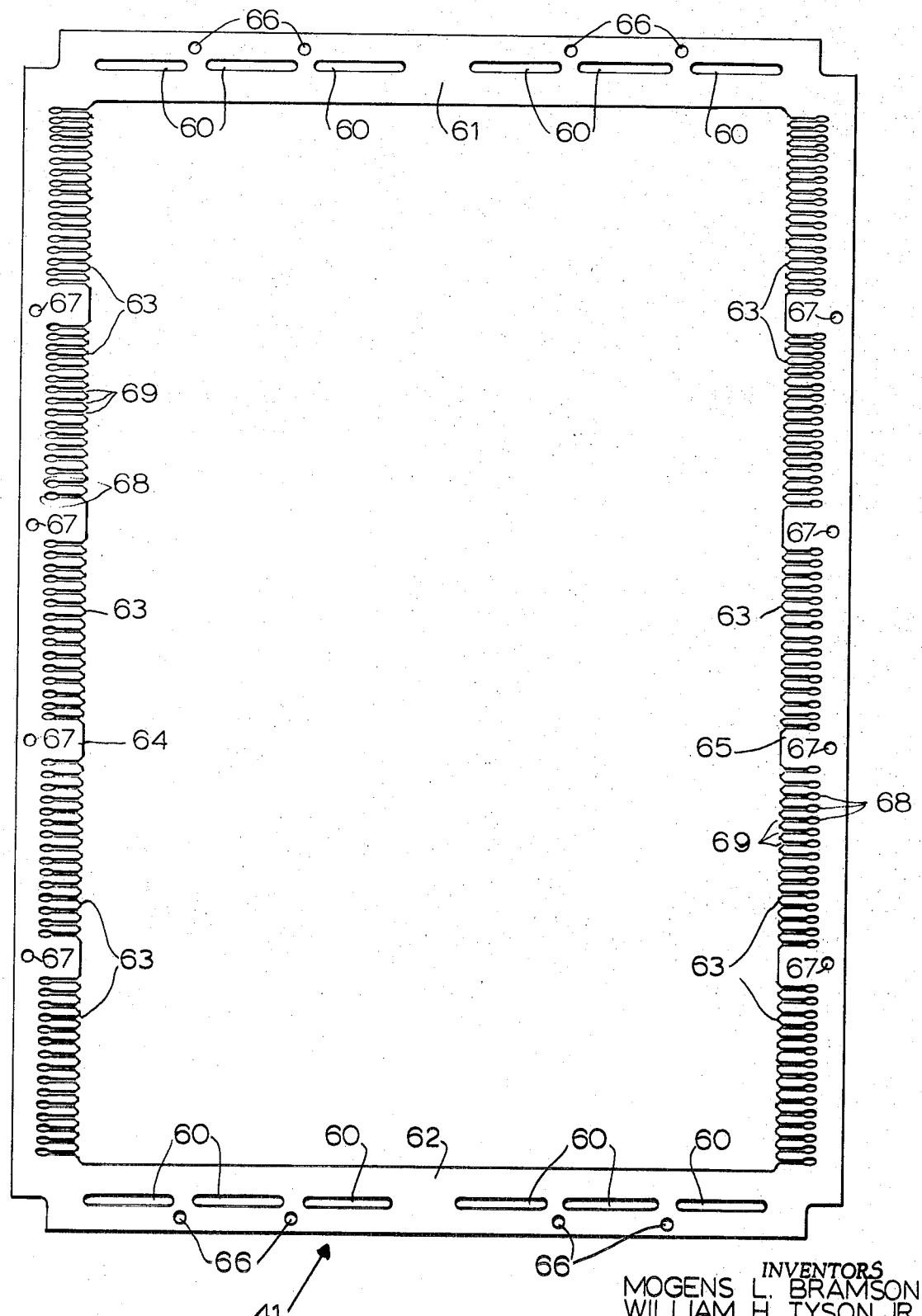
FIG. 8 is a view like FIG. 6 of a frame used in the blood cell.
Figure 9:
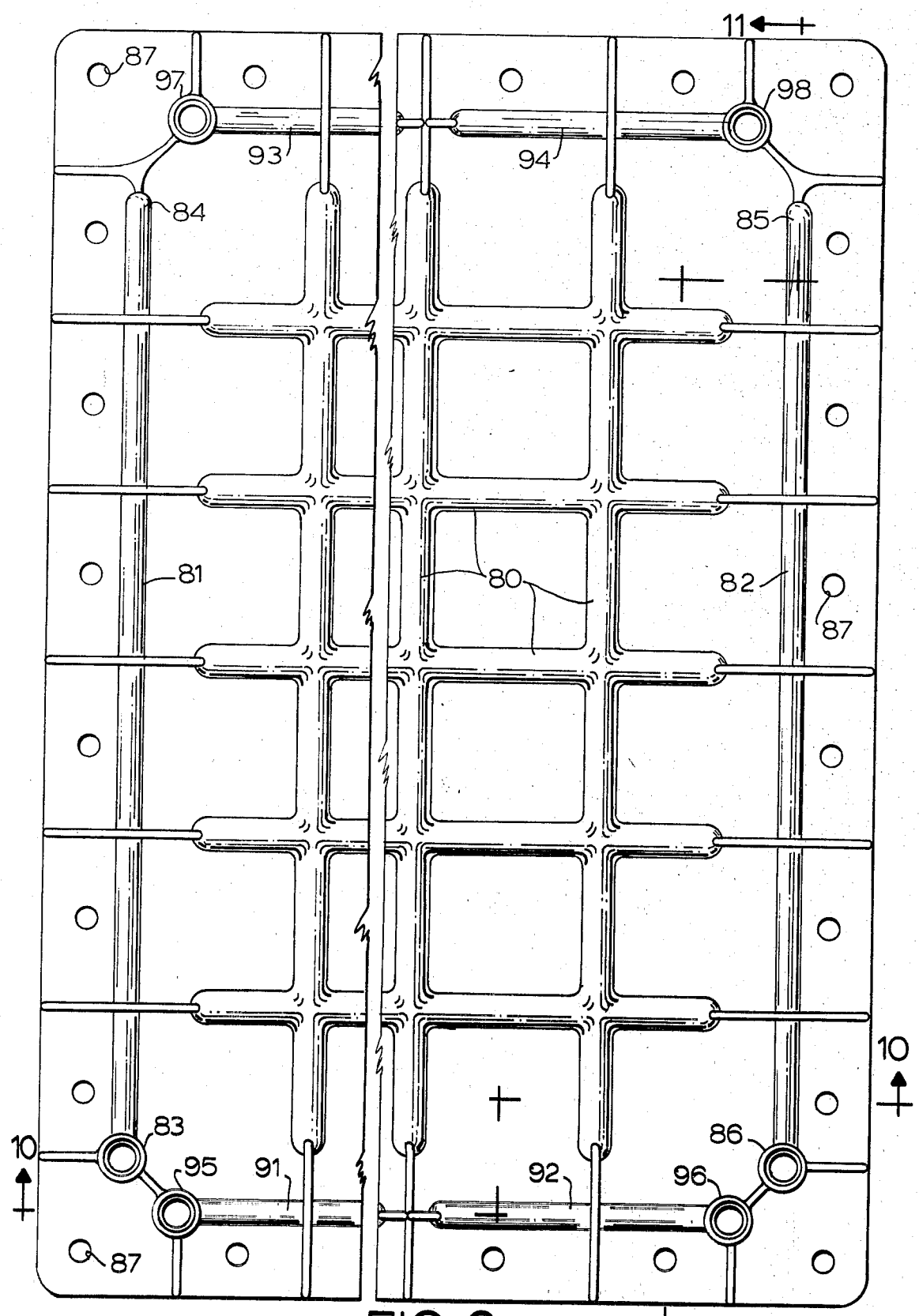
FIG. 9 is a fragmentary top plan view of one of the end manifold pressure plates; the view has been broken in the middle in order to conserve space.

The method for the distribution of the three fluids in the membrane diffusion apparatus may be seen by reference to FIGS. 6, 7 and 8.

FIG. 6 shows a frame member 37, which may be used for either oxygen or water, depending upon the way in which it is disposed. As shown, it is an oxygen frame 37', and if it were turned over or this view considered as a bottom view, it would then be a water frame 37. The frame 37' is four sided and is open in the center. Its long sides 42 and 43 are each provided with a series of lengthwise extending manifold slots 44 and a series of guide pin openings 45. One half of each of the two short sides 46 and 47 is provided with a plurality of manifold slots 48, extending widthwise, all of the slots being confined to one side, and the two short sides have a plurality of guide pin openings 49. The slots 48 of the side 46 are diagonally opposite the slots 48 of the side 47. The other half of each side 46, 47 (again, diagonally opposite) has a series of comb-like inlet members 50, between which water or oxygen, being conducted by manifold slot portions 51, can pass through by channels 52 into the space inside the frame 37 or 37'. The frame 37 is symmetric along its diagonal axis and if it is turned over to form a frame 37', the comb-like members 50 and slots 48 will be on the opposite sides. This means that slots 48 for a water frame 37 can conduct oxygen while water is conducted from the slots 51 through the channel portions 52, so that only water goes into the interior of a cell having a frame 37 so disposed. When the frame 37 is turned upside down, and oxygen is applied, oxygen is conducted from the slots 51 through the channel portion 52, and water flows through the slots 48, so that water will not get inside an oxygen cell. The slots 44 on the longitudinal members 42 and 43 are used as part of the manifold conduits for blood. Thus when a large number of plates is stacked up, the slots 44, 48, and 51 result in the formation of conduits, and only between the comb-like members 50 is there access to what is inside the frame 37.

A portion of one of the comb-like members 50 is shown in detail in FIG. 7, and it will be seen that it has a series of manifold slots 51, spaced apart by barrier portions 53, and that each slot 51 is joined by a narrow channel 52 (separated from an adjacent channel 52 by a carrier 54) to the inner edge 55 of the frame 37 where each channel 52 flares out at a portion 56 along the inner edge 55 and where the fluid passes into the center of the frame 37. In a water frame 37 as in an oxygen frame 37', the water or oxygen enters at one side 46 or 47 and leaves at the opposite side 47 or 46. Since the frame 37 is made symmetric along the diagonal axis, it can be assembled in either manner, the inlet and outlet sides being identical. The frame 37 may have corner cut outs 57 at each corner.

The blood frame 41 (FIG. 8) differs from the water or oxygen frame 37 in that it has manifold slots 60 along both halves of each side edge portion 61, 62 and, in place of the manifold slots 44 found in the water and oxygen frame 37 along the longitudinal sides 42 and 43, the blood frame 41 has comb members 63 along each longitudinal portion 64, 65, the channels 69 of each comb member 62 enabling ingress or egress of blood, so that the blood enters on one side 64 or 65 and leaves on the other side 65 or 64 of the blood frame 41. The comb members 63 are, except for numbers of channels 52, identical to the comb member 50 of FIG. 7. All channels 52 are of identical width and volume and they are equally spaced apart in each comb member 63. The configuration of comb members 63 is important. The flared-out portions at 56 of the channels 52 allow the blood to enter the inner space of frame 41 without being jetted or throttled as well as allowing the blood to be spread out to meet the entire edge of the interposing screen 38 in a uniform fashion. There are guide pin openings 66 on the ends aligned with the guide pin openings 49 and guide pin openings 67 aligned with the openings 45 of the frame 37. The slots 60 are aligned with slots 48 or with slots 51 of the frame 37, and the slots 68 are aligned with slots 44 of the frame 37.

The spacer-frame members 36 are generally like the water-oxygen frame member 37 and blood frame member 41, except that they have no comb members and their manifold slots have no openings leading into the open space of the frame 36; guide pin openings are aligned with the corresponding parts of the frames 37 and 41. In other words, only slots of the type 44 on the long side and slots of the type 48 (or 60) along the shorter side appear in spacer-frame 36. The result, of course, is that the spacer-frames 36 serve to help define the conduits provided by the slots 44, 48 and 60 and by the slots 51 and 68, but do not permit any ingress or egress of fluid into the open spaces of frames 36. The frames 36, 37 and 41 are generally flexible and are preferably made from low-density polyethylene. Preferably the frame 36 is 0.010 to 0.020 inch thick, while the frames 37 and 41 are preferably 0.020 to 0.040 inch thick, although slight variations in thickness are acceptable.

Figure 14:
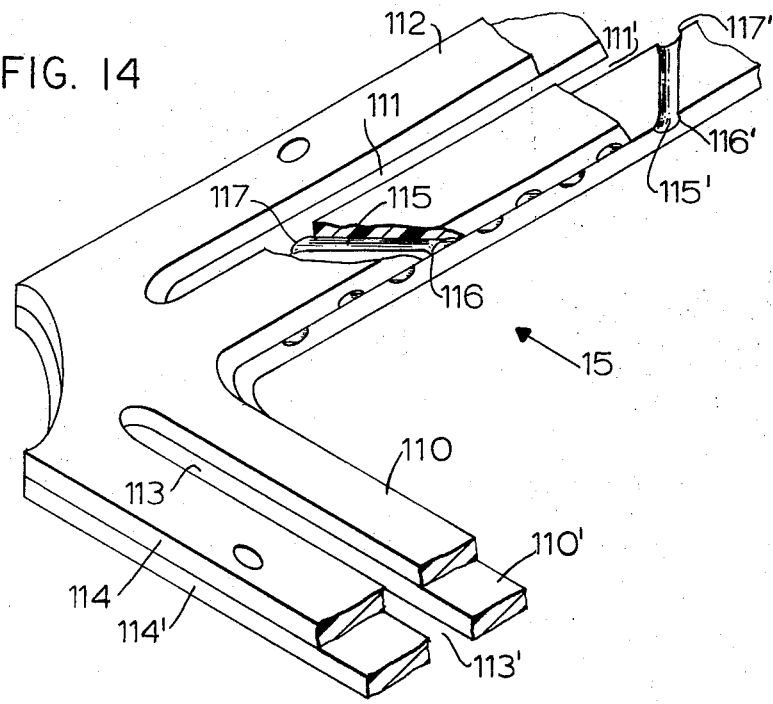
FIG. 14 is a fragmentary view in perspective of a portion of a modified two frame assembly for a blood cell, with portions broken way and shown in section.
Figure 15:
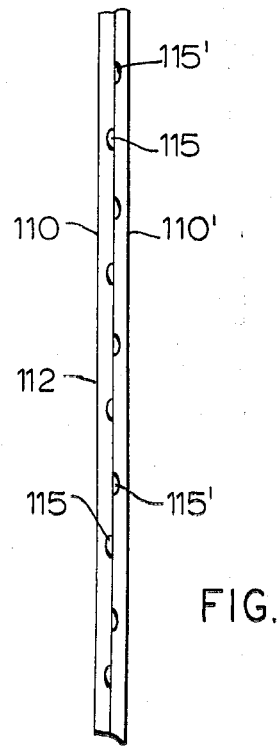
FIG. 15 is a fragmentary view in elevation looking along the arrow 15 in FIGS. 14 and 16.
Figure 16:
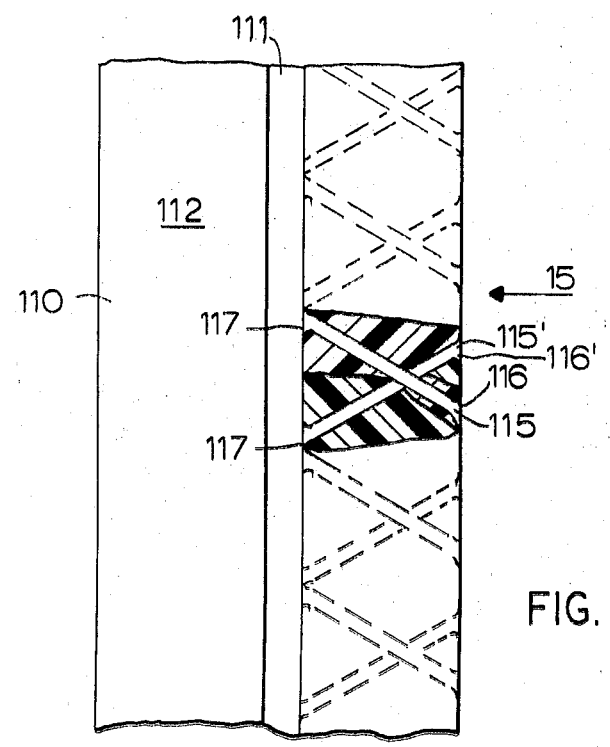
FIG. 16 is a top plan view of a portion of FIG. 14 showing in dotted lines the channels, with portions broken away.
Figure 17:
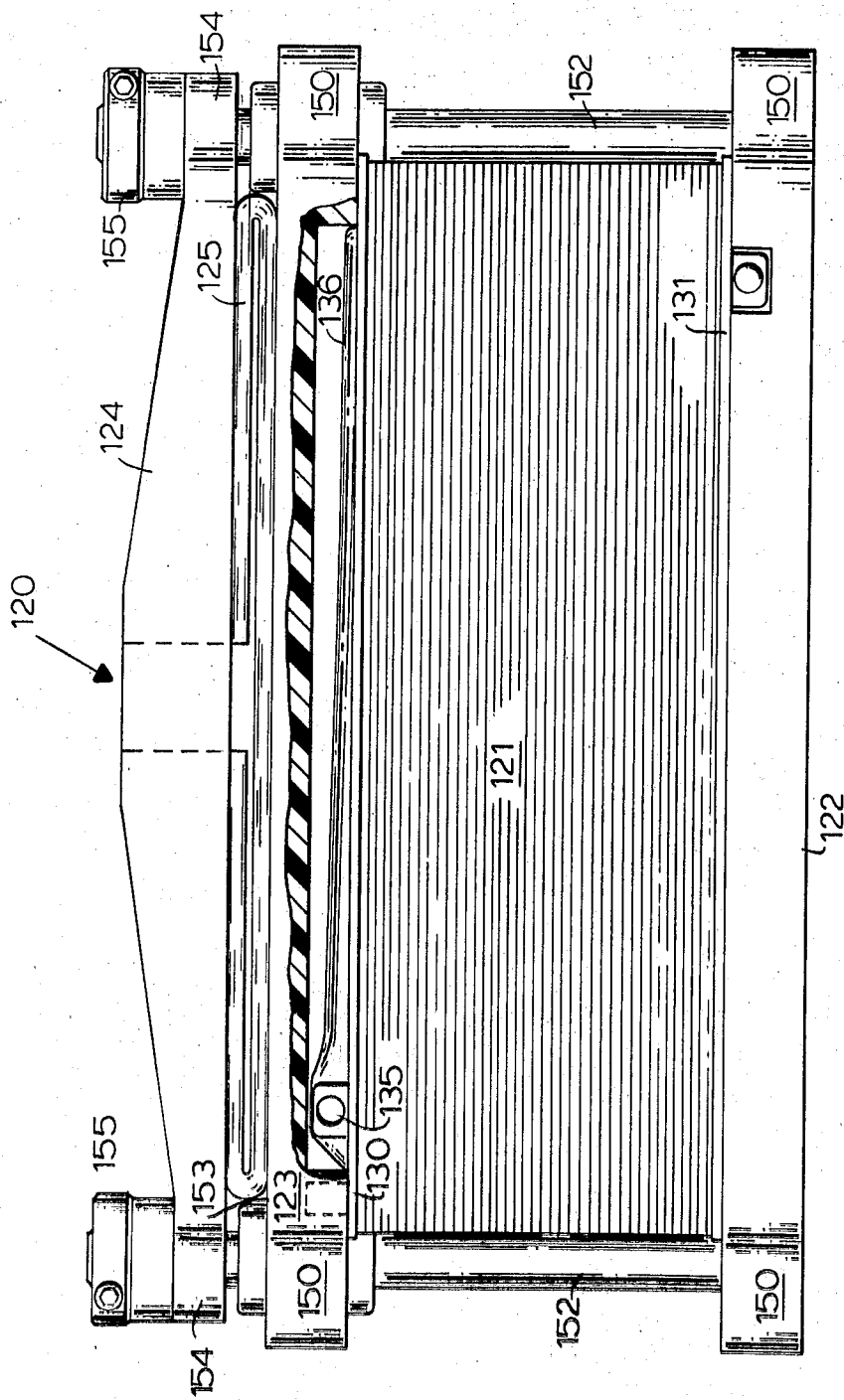
FIG. 17 is a view in elevation of a modified form of membrane lung assembly embodying the principles of the invention.
Figure 18:
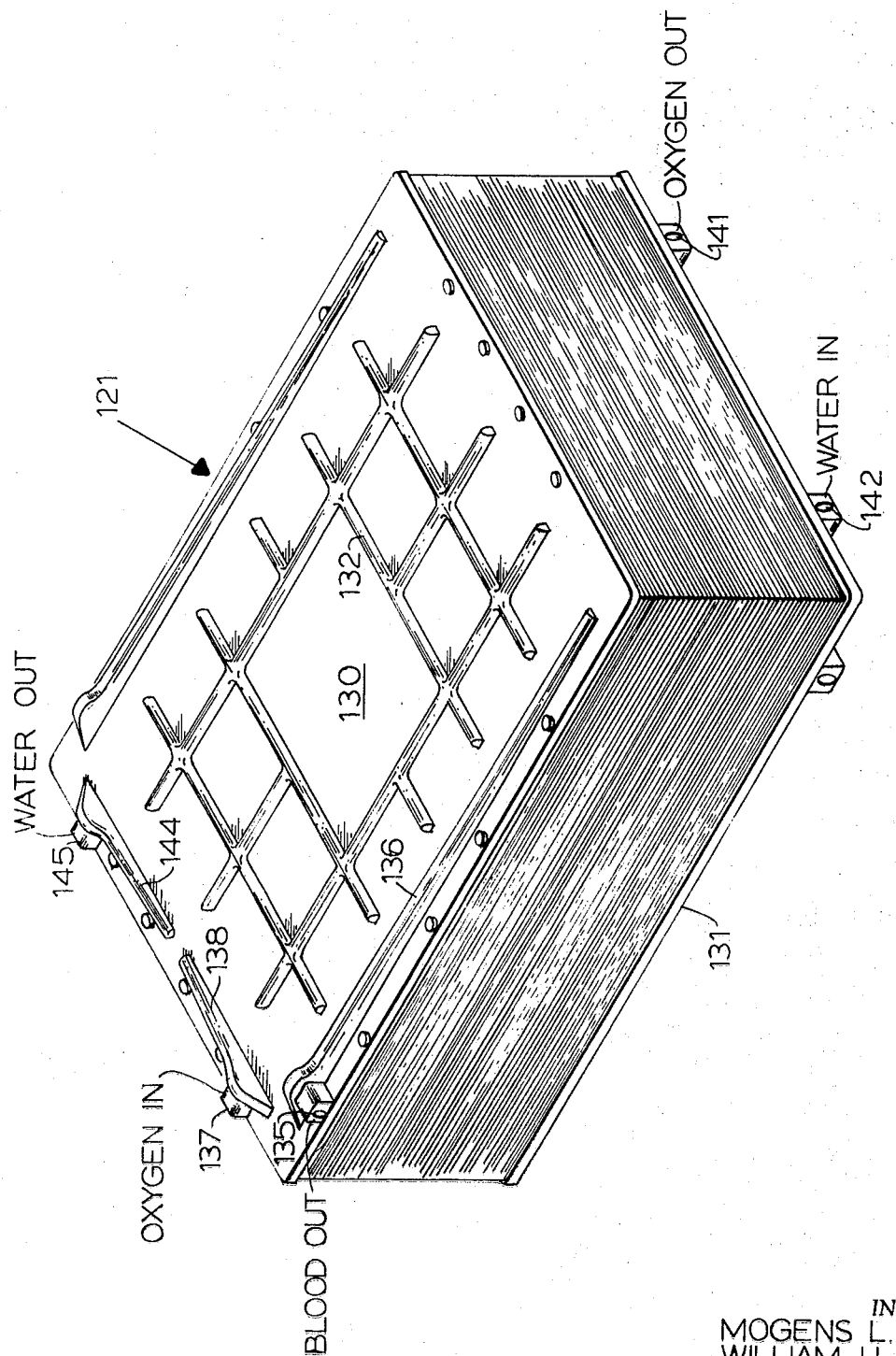
FIG. 18 is a view in perspective of the disposable portion of the assembly of FIG. 17.
Figure 19:
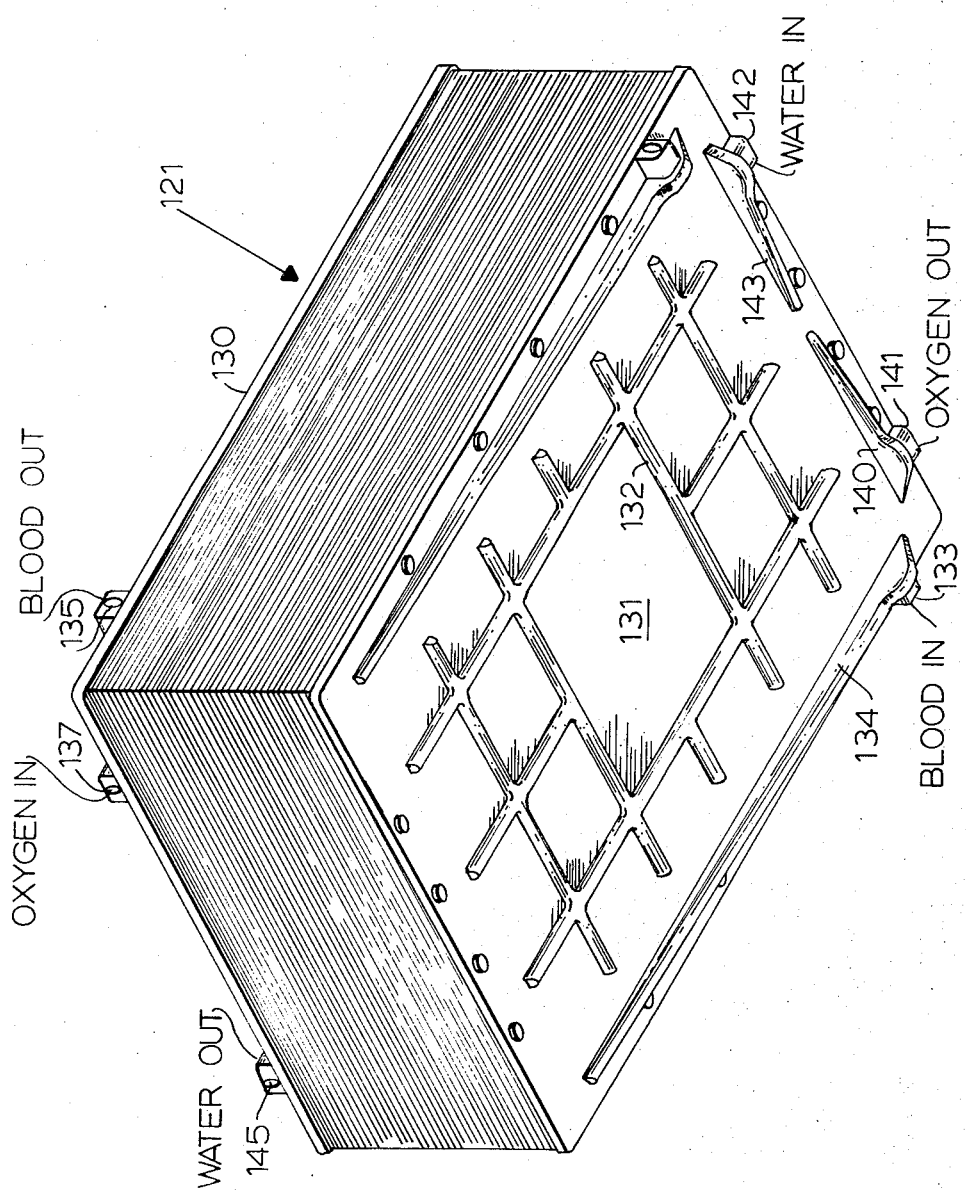
FIG. 19 is another view in perspective, from a different viewpoint, of the same disposable portion shown in FIG. 18.

The structure so far described has depended on the use of two types of frames in a tripartite assembly — one central frame 37 or 37' or 41 sandwiched between two spacer frames 36 However, the tripartite assembly is not essential, and the same degree of flow uniformity may be obtained by a bipartite assembly, such as that shown in FIGS. 14 – 16. Here two identical frames 110 and 110' create the same basic effects. The general appearance of each frame 110 and 110' is much like that of the frame 41, in that each of them has a manifold slot 111 or 111' through each long side 112 for conducting blood, and each of them has two manifold slots 113 or 113' through each short side 114 or 114', one for water and one for oxygen. By way of example, the slots 111 and 111' may each extend for nearly the full length of the long side 112, instead of using a series of shorter slots 44; similarly, the slots 113 and 113' may each extend about half of the distance along the shorter side 114 or 114', rather than having a series of shorter slots like the slots 48 and 60. In the frames 110 and 110', the blood cell frames, there are series of diagonally extending channels 115 and 115'. They preferably lie at an angle of 60° to the manifold slots 111, 111' and, since the frames 110 and 110' are identical and are placed face to face, the channels 115 of the frame 110 cross the channels 115' of the frame 110'. Both channels 115 and 115' are flared out at each end 116, 117, or 116', 117', for the same reason as the flared-out portions 56.

The bipartite frames for water and oxygen are like the frames 110 and 110' except that similar channels lead to one of the manifold slots 113 along the short side 114 and to a similar slot diagonally opposite the slot 113.

In all cases, the channels 115 etc. are uniformly disposed along their manifold slots 111 or 113 etc. and are sufficient in number, size, and shape to assure gentle flow of the blood or other fluid into the interiors of the cells. The diagonal disposition of the channels 115 etc. and the crossing of the facing channels 115 and 115' provides support for the flat sealing faces on the outside of the bipartite frame unit 110, 110'. The channels 115 are usually semicircular in cross section and about half the depth of their frame member 110.

The water cell membrane 35 and the blood cell membrane 40 differ from each other only in the materials from which they are made, both being flat sheets. The membrane 40 is gas pervious to enable the oxygen to diffuse into the blood, but it is impervious to blood, so that the two membranes 40 retain the blood in the blood cell 31 while enabling oxygenation of the blood to occur. The membrane 35, on the other hand is impervious both to water and to oxygen. Both of these members 40 and 35 are rectangular sheets with the same peripheral dimensions as the frames 36, 37 and 41, and both of them are provided with manifold slots that line up with the slots 44, 48, and 60 and with the slots 51 and 68 in the frames 36, 37, and 41. There is no comb formation in the sheets 35 and 40. Both are symmetrical members and can be inverted or put in the opposite direction without making any difference. The membrane 35 may be 0.005 inch thick polyethylene, while the membrane 40 may be 0.005 inch thick silicone coated glass fiber fabric. Other compositions may be used if desired, but these are preferred ones.

The screen 38 used in the oxygen cell 32 may be identical to that used in the blood cell 31 in size, shape, and construction. The screens 38 are of uniform thickness and prevent the water cell membrane 35 from closing the oxygen or blood cells 32 and 31 to the extent that oxygen or blood might not pass through. The screens 38, besides being used to obtain uniform thickness of space between the membranes, also compel the blood and oxygen to flow in a gently turbulent fashion through their respective cells. By providing this gentle turbulence, the screens 38 reduce the boundary layer resistance of the blood, which is normally found in the types of oxygenators in which hollow capillary passages are provided for the blood to pass through. The screens 38 for blood may be made from polypropylene plastic fiber or any suitable material which has compatibility with the blood, and preferably the screens 38 are woven. The blood spacer screens 38 are typically 0.010 to 0.030 inch thick. The oxygen spacer screens 38 are of similar dimensions and are usually woven fiberglass yarn coated with non-toxic polyvinyl chloride.

It will now be appreciated that when the members 35, 36, 37, 38, 40 and 41 are assembled into the water cells 33, oxygen cells 32 and blood cells 31, the cells themselves being assembled into units 30 and a plurality of the units 30 are stacked, what results is a number of manifold slots providing conduits for incoming blood on one longitudinal margin, outgoing blood on the opposite longitudinal margin, incoming water on one half of one end, outgoing water on a diagonally opposite half of the other end, incoming oxygen on the other half of one end, and outgoing oxygen on the diagonally opposite other half of the other end. In addition, within each cell 31, 32 or 33 there is one and only one frame 37 or 41, which is designed so that it, when applied to that cell, enables the desired fluid to enter that cell and flow between the incoming comb-like members 50 or 53 to the spaces between the outgoing comb-like members. Thus in the water cell 33, the water frame 37 enables water to come in from the incoming water conduits and to flow to the outgoing water conduits. In the oxygen cell, the oxygen frame 37' (which is the same frame as the water frame, but flipped over so that it accepts flow from a different set of slots) enables the incoming oxygen to flow through the oxygen cell and to come out the outlet side. Similarly, in the blood cell 31, the blood frame enables the blood to flow from the incoming side between the comb-like members 63 into the interior of the cell between the two membranes 40 and flow mildly and turbulently around the blood screen 38 and to leave the other side of the blood cell 31 between comb-like members 63 into the outgoing blood conduits.

The manifold slots are rounded at the ends and are of such dimensions that they provide, in their totality, cross-sectional areas at least as large as the cross-sectional area of the inlet and outlet tubes of the end plates 21 and 22. Consequently, blood flows unrestrictedly as a wall of blood both to and from the stack of blood cells.

When these cells and their components are assembled, they may be welded together, either cell by cell, or all at once, or may simply be held in place by bolts 75 exerting pressure. In either case, there is no leakage to the outside or within, and the flow of liquid therefore takes place only through the slots or through the passageways provided by the comb-like members 50 and 63, when it is desired to have a particular fluid flow through a cell.

It will be appreciated that the flow of each fluid is in effect in parallel, that is, all the blood enters one side of the device through the housing slots and all of it leaves at the outlet taken from the outflowing slots, all the flow therefore inside is in the same direction from the incoming side to the outgoing side. The same thing is basically true again of the water flow and oxygen flow within their cells and the unit itself. All the cells of any one type are in parallel with all the other cells of that same type.

The two manifold pressure plates 21 and 22 are identical to each other, but again are oriented to give different results so far as inlet and outlet flow is concerned. Both plates 21 and 22 may be made of suitable plastic material such as polypropylene. In this instance, the material is somewhat thicker, and manifolds or conduits for the fluids are provided by molded recesses.

Ribs 80 may be provided in a checkerboard arrangement on the exterior surface of the plates 21 and 22 for the purpose of adding strength to the plates. Each plate 21 or 22 has two longitudinal manifolds or conduits 81 and 82 provided by recesses, preferably tapered, extending longitudinally, one on each side, which communicate with the manifold slots 44 and 68 of the water, oxygen, and blood cells. One end of the conduit 81 is deeper or higher and communicates with a port 83 and then the conduit 81 tapers down to another end 84, which is closed and where the conduit 81 is shallower. Similarly, the conduit 82 is larger at a port 86 and smaller at a closed end 85. When the plate 22 is used as the bottom plate, the port 83 is plugged and the port 86 is in open communication with the blood inlet tube 26. When the plate 22 is turned end over end in a longitudinal direction, it becomes a top plate 21; in the plate 21 the port 86 is then plugged and the port 83 is opened to be in communication with the blood outlet tube 23. The tapering of the blood conduits 81 and 82 facilitates the distribution of blood entering and leaving the oxygenator, so that uniform volumes of blood are presented to the blood cell manifolds which are in communication with the conduits 81 and 82. This tapering also reduces priming volumes.

Each plate 21, 22 has four latitudinal manifolds or conduits 91, 92, 93, 94 for conducting oxygen and water, two at each end, each one less than half the length of the latitudinal side; and each of these conduits 91, 92, 93, 94 communicates with manifold slots 48, 51, and 60 of the water, oxygen, and blood cells. Each conduit 91, 92, 93, 94 communicates with a port 95, 96, 97, 98, respectively, two of which are open and two are plugged. In one example, the ports 97 and 98 of the bottom plate 22 are plugged, and the ports 95 and 96 are in open communication with the oxygen outlet 27 and the water inlet 28, respectively. When turned end over end in a longitudinal direction, the plate 22 becomes the top plate 21, and the ports 95 and 96 are in open communication with the water outlet 25 and oxygen inlet 24, respectively.

It will be observed that the arrangement of the top and bottom plates 21 and 22 is such that the inlet for any one fluid in one plate is located diagonally opposite the outlet for that fluid in the other plate. This diagonal arrangement of inlet and outlet ports for the blood, in combination with the manifold system of the present oxygenator, guarantees that each and every portion of blood going through the oxygenator will travel a pathway equal in length to that of every other pathway. This has been borne out by the observation that when a solution of dye is introduced in the blood inlet tube, it is immediately distributed completely and uniformly throughout the blood cells. Similar tests performed on available membrane oxygenators, whose designs had inlet and outlet ports on one side of the stack of cells, showed that the dye concentrated on that side for a period of time before slowly spreading out.

A plurality of bolt openings 87 is provided, and bolts 75 are provided to clamp the assembly firmly together and make it leak tight.

A rectangular modification (FIGS. 17–20)

Many modifications of the basic concept are possible. For example, FIGS. 17–20 show an assembly 120 made up of a disposable sub-assembly 121, a pair of metal end plates 122 and 123, a metal pressure plate 124, and an inflatable air cushion 125.

The disposable sub-assembly 121 may differ from the assembly 20 only in that there are different plastic end plates 130 and 131, which are identical. Or the assembly 20 may use the bipartite frame assembly of FIGS. 14–16 or some other modification. At any rate there is a stack of three types of cells in the order described before. The end plates 130 and 131 extend slightly beyond the rest of the stack 121. Unlike the end plates 21 and 22, the end plates 130 and 131 are made from relatively thin, less expensive plastic, e.g., it may be one-eighth inch thick. A gridiron pattern of ribs 132 helps to strengthen the center portion. An inlet 133 for blood leads into the bottom plate 131 where there is a tapered conduit 134, and an outlet 135 for blood leads from a tapered conduit 136 on the upper plate 130. An inlet 137 for oxygen leads to a tapered conduit 138 on the plate 130, and the plate 131 has a tapered conduit 140 having an outlet 141 diagonally opposite the inlet 137. Similarly, an inlet 142 for water leads into a tapered conduit 143 in the lower plate 131, and the upper plate 130 has a tapered conduit 144 whence leads an outlet 145, diagonally opposite the inlet 142.

The non-disposable metal end plates 122 and 123 have recesses 146 to receive the ribs 132 and touch them, and recesses 147, 148 and 149 for the tapered conduits of the plastic end plates 130 and 131. The metal end plates 122 and 123 are larger in area than the sub-assembly 121, and they have four integral lugs 150, one at each corner, each with an unthreaded bolt opening 151. Bolts 152 extend up from the bottom plate 122 through and above the plate 123; they do not touch nor pass through the disposable sub-assembly 121.

The plate 123 has a flat upper face 153 on which an inflatable cushion 125 rests, and the pressure plate 124 rests above the cushion 125 and has lugs 154 through which the bolts 152 extend. Nuts 155 are tightened on the bolts 152 to exert only light pressure. Then the cushion 125 is inflated with air or other gas or water to provide an even, firm pressure on the end plate 123 of any desired amount, which is transmitted to the stack 121.

In the priming operation, using the device of FIGS. 1–11 as an example, the apparatus is suspended or supported in a slanting position in such a way that the blood inlet port 26 is positioned at the lowest point and the blood outlet port 23 at the highest point of the assembly. Water is then introduced and after its proper pressure and flow is established, a physiological solution is pumped through the blood spaces, entering at the lower blood port 26 and leaving at the upper port 23, until air bubbles no longer appear. The physiological solution is then displaced by blood from a priming reservoir until undiluted blood appears. The assembly is then ready for use.

Figure 12:
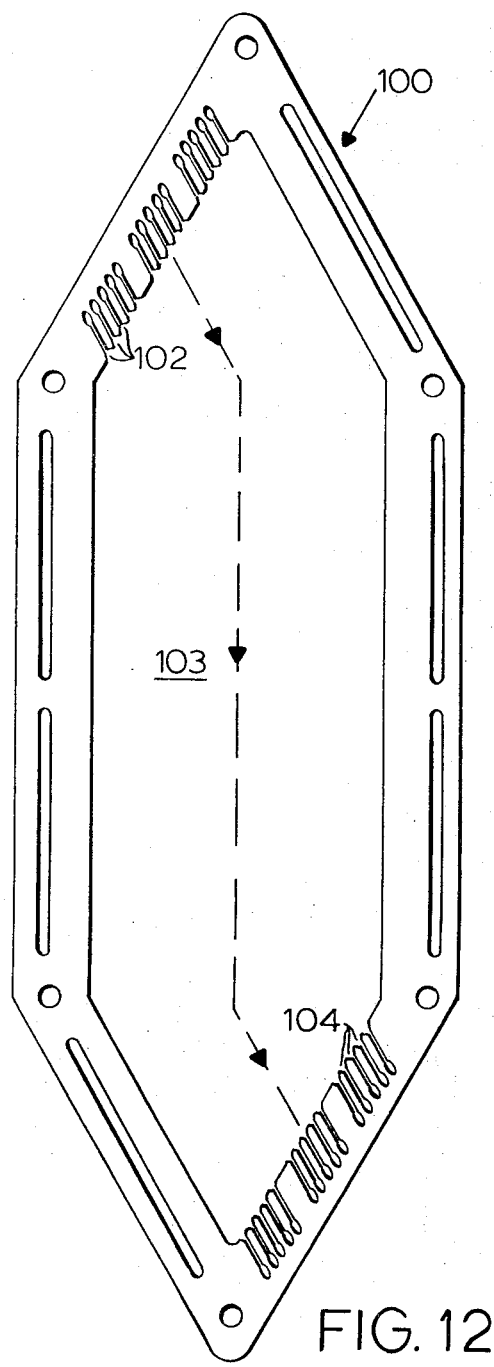
FIG. 12 is a top plan view of another version of a frame member for use in both oxygen and blood cells.
Figure 13:
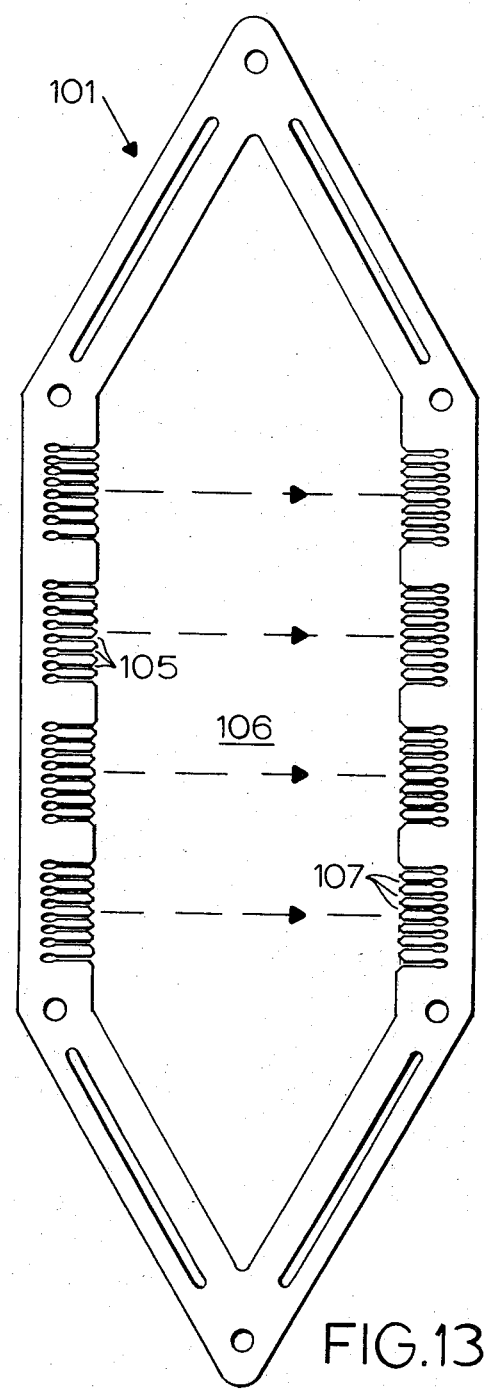
FIG. 13 is a top plan view of another version of a frame member for use in the water cell.

A hexagonal modification (FIGS. 12 and 13)

A modification of the membrane oxygenator of the present invention may consist of a stack of cells similar to that described above, in which the various frames 100 and 101 comprising the individual cells are in the shape of hexagons, a preferred embodiment of which is shown in FIGS. 12 and 13. The frame 100 can be used in a blood cell and, turned over, may be used as the frame for an oxygen cell. Blood flows between comb-like members 102 into the screened space 103 and exits between the comb members 104 on the opposite side. Similarly, oxygen may flow in a similar pattern through the frame 100 turned over. The frame 101 is a water frame in which water flows in between comb-like members 105 into the space 106 and exits between comb members 107 on the side opposite.

An octagonal modification for use with four fluids (FIGS. 21–23)

It is evident that the membrane oxygenator of the present invention is not limited to rectangular or hexagonal cell frames or to three fluids. Other geometry may be employed, such as the octagon, in which case four fluids may be accommodated. Such an octagonal assembly is particularly useful when it is desired to oxygenate and dialyze the blood supply simultaneously, as in the preservation of body organs prior to transplantation or in cases of concurrent damage or malfunction of the kidney and heart. The four-fluid assembly for this use by way of illustration would preferably be arranged in the order: water cell, oxygen cell, blood cell, dialysate cell, blood cell, oxygen cell, water cell, oxygen cell, etc., although other arrangements are feasible such as: water cell, dialysate cell, blood cell, oxygen cell, blood cell, dialysate cell, water cell, dialysate cell, etc., as well as: water cell, dialysate cell, blood cell, oxygen cell, water cell, dialysate cell, blood cell, oxygen cell, etc.

Frames 160, 161, and 162 as shown in FIGS. 21, 22, and 23 represent a preferred embodiment of the frames used in octagonal assembly. The frame 160 can be used in a blood cell and, turned over, may be used as the frame for a dialysate cell. Blood flows through channels 163 into the space 164, preferably provided with a screen, previously described, and exits through channels 165 on the opposite, parallel side. In the meanwhile, dialysate flows through conduits provided partly by slots 166 and 167 in each of the frames 160, 161, and 162. Similarly, dialysate may flow in a similar equal stream line pattern through frame 160 turned over, while blood flows through slots 168 and 169 in the cells 161 and 162 and the inverted slots 166 and 167 of the frame 160. In the frames 160 and 162, oxygen flows through slots 170 and 171, while in the frames 160 and 161, water flows through slots 172.

The frame 161 is an oxygen frame in which oxygen flows through channels 173 into the space 174, which preferably has a screen, as previously described, and exits through channels 175 on the opposite side. The frame 162 is a water frame, in which water flows through channels 176 into a space 177 and exits through channels 178 on the opposite side.

Membranes, which are not illustrated but are the same shape as the frames 160, 161, and 162, are used between the frames of a dialysate cell and a blood cell, and they are semipermeable, such as cellophane or a membrane of the anisotropic type such as that manufactured by the Amicon Corporation. In an assembly where water and dialysate cells are adjacent, the membranes are water-impervious material. The semipermeable membrane is preferably sealed at its outer edge with a water-impermeable material such as silicone elastomer. This may be conveniently accomplished by applying a silicone adhesive to the outer wall surfaces of the stack of cells after assembly. The number of units of cells to be used depends upon the purpose for which the oxygenator-dialyzer is intended. For example, for pediatric use, with frames having the dimensions 8 inches on the longer sides and 2 inches on the shorter sides, ten units are generally adequate. For adult use, generally 25 units will be suitable. If the device is to be used for perfusion of a body organ such as the kidney, then six units may be sufficient.

With the hexagonal or octagonal assembly, counter-current as well as co-current flow patterns of equal path length may be provided, as compared to the cross-current flow of the rectangular assembly.

Some advantages of the invention

It will be seen that the membrane oxygenator as described above accomplishes the objectives set forth previously. Thus, oxygenation efficiency is improved, since the wide expanse of manifold slots 68 at the periphery of the blood cells in combination with the connecting manifold slots 44 provide for an unrestricted wall of blood to be presented to all the blood cells in a uniform manner, and any one portion of the blood flows the same distance through the cells as any other portion, with a minimum of pressure drop. The presence of screens 38 in the blood cells 31 produces very thin tortuous channels and effects a mildly turbulent flow of the blood, both very important features to efficient oxygenation. Trauma to the blood is kept at a minimum by virtue of the manifold slot construction in the cells, which reduces throttling of the blood as it passes through the oxygenator so that the external pumping pressure for the blood, required for all oxygenators, can be greatly reduced. Constant blood volumes are maintained by the uniform pressure from the water mattresses 33, and this facilitates perfusion management. Further, since the oxygen outlet may be and generally is open to the atmosphere, oxygen pressures are lower than the pressure of the blood, and this, combined with the construction of the oxygenator wherein the blood enters by inlet 26 at a bottom corner of one pressure plate 22 and exits from outlet 23 at the corner diagonally opposite on the other pressure plate 21, virtually eliminates the chance for gas emboli to enter the blood.

As an example of a typical performance of the membrane oxygenator of this invention with an assembly of 15 units of dimension 14 × 20 inches, oxygen saturation of 93 percent was achieved on venous blood (with an initial oxygen saturation of 60 percent) and at a flow rate of 4.5 liters per minute. Furthermore, the membrane oxygenator can be operated as long as 130 hours without showing a significant decrease in performance, i.e., decrease in oxygenation efficiency or increased trauma to the blood.

For some uses, as for small children and small animals, there is no need to stack units on units. For example, a single basic unit of water cell, oxygen cell, blood cell, oxygen cell, and water cell suffices between the end plates in an oxygenator for babies. Similarly in a dialyzer for small children one unit suffices. Th number of units can be varied as needed.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. A membrane diffusion apparatus for liquid gasification and dialysis comprising a stack of at least three different kinds of cells arranged in a set order wherein each two successive cells are of different kinds and wherein a first kind of cell and a second kind of cell are always separated from each other by a different kind of cell, said first kind of cell comprising membranes overlying both sides of first frame means, said second kind of cell comprising gas and liquid impermeable closure means overlying both sides of second frame means, manifold means in the periphery of all said cells and their frame means, membranes, and closure means for conducting independently a series of separate fluids through said stack and for distributing them into first, second, and other cells, said manifold means including a multiplicity of fine comb-like elements providing unrestricted uniform flow of each said fluid to and from inner spaces of its cells, said stack being enclosed by two end clamping means, each including conduit means connecting said manifold means with inlet and outlet ports, each said fluid having an inlet port in one said end clamping means and an outlet port in the other said end clamping means, so that force from pressure of one said fluid, the fluid flowing through each said second cell, is directed against said closure means to generate a constant volume of uniform thickness in each said first cell enabling gently turbulent uniform flow of said first fluid, and enabling uniform diffusion exchange between the fluid flowing through said first cell and another fluid.

2. The membrane diffusion apparatus of claim 1 wherein each said fluid has an inlet port in one said end clamping means and an outlet port diagonally opposite the inlet port and in the other said end clamping means.

3. The membrane diffusion apparatus of claim 1 wherein each said frame means comprises a pair of spacer frames, and a main frame sandwiched between the spacer frames, said manifold means in said main frame only including a multiplicity of fine comb-like elements.

4. A membrane diffusion apparatus for liquid gasification and dialysis comprising a stack of only three different kinds of cells, for use with three separate fluids, arranged in a set order wherein each two successive cells are of different kinds and wherein a first kind of cell and a second kind of cell are always separated from each other by a third kind of cell, there being said third kind of cell on both sides of each said first kind of cell and having third frame means, said first kind of cell comprising membranes overlying both sides of first frame means, said second kind of cell comprising gas and liquid impermeable closure means overlying both sides of second frame means, said first and third frame means being identical except that one is inverted relative to the other, manifold means in the periphery of all said cells and their frame means, membranes, and closure means for conducting independently a series of said separate fluids through said stack and for distributing them into said first, second, and third cells, said manifold means including a multiplicity of fine comb-like members providing unrestricted uniform flow of each said fluid to and from inner spaces of its cells, said stack being enclosed by two end clamping means, each including conduit means connecting said manifold means with inlet and outlet ports, each said fluid having an inlet port in one said end clamping means and an outlet port in the other said end clamping means, so that force from pressure of one said fluid, the fluid flowing through each said second cell, is directed against said closure means to generate a constant volume of uniform thickness in each said first cell enabling gently turbulent uniform flow of said first fluid, and enabling uniform diffusion exchange between the fluid flowing through said first cell and another fluid.

5. A membrane diffusion apparatus for liquid gasification and dialysis comprising a stack of only three different kinds of cells, for use with three separate fluids, arranged in a set order wherein each two successive cells are of different kinds and wherein a first kind of cell and a second kind of cell are always separated from each other by a third kind of cell, there being said third kind of cell on both sides of each said first kind of cell and having third frame means, said first kind of cell comprising membranes overlying both sides of first frame means, said second kind of cell comprising gas and liquid impermeable closure means overlying both sides of second frame means, said second and third frame means being identical except that one is inverted relative to the other, and each said frame being polygonal, manifold means in the periphery of all said cells and their frame means, membranes, and closure means for conducting independently a series of said separate fluids through said stack and for distributing them into said first, second, and third cells, said manifold means including a multiplicity of fine comb-like elements providing unrestricted uniform flow of each said fluid to and from inner spaces of its cells, said stack being enclosed by two end clamping means, each including conduit means connecting said manifold means with inlet and outlet ports, each said fluid having an inlet port in one said end clamping means and an outlet port in the other said end clamping means, so that force from pressure of one said fluid, the fluid flowing through each said second cell, is directed against said closure means to generate a constant volume of uniform thickness in each said first cell enabling gently turbulent uniform flow of said first fluid, and enabling uniform diffusion exchange between the fluid flowing through said first cell and another fluid.

6. A membrane diffusion appratus for liquid gasification and dialysis comprising a stack of four different kinds of cells, for use with four separate fluids arranged in a set order wherein each two successive cells are of different kinds and wherein a first kind of cell and a second kind of cell are always separated from each other by a different kind of cell, there being a third kind of cell with third frame means and a fourth kind of cell with a fourth frame means, said first kind of cell comprising membranes overlying both sides of first frame means, said second kind of cell comprising gas and liquid impermeable closure means overlying both sides of second frame means, said first and third frame means being identical except that one is inverted relative to the other, and each said frame being polygonal, manifold means in the periphery of all said cells and their frame means, membranes, and closure means for conducting independently a series of said separate fluids through said stack and for distributing them into first, second, third, and fourth cells, said manifold means including a multiplicity of fine comb-like elements providing unrestricted uniform flow of each said fluid to and from inner spaces of its cells, said stack being enclosed by two end clamping means, each including conduit means connecting said manifold means with inlet and outlet ports, each said fluid having an inlet port in one said end clamping means and an outlet port in the other said end clamping means, so that force from pressure of one said fluid, the fluids flowing through each said second cell, is directed against said closure means to generate a constant volume of uniform thickness in each said first cell enabling gently turbulent uniform flow of said first fluid, and enabling uniform diffusion exchange between the fluid flowing through said first cell and another fluid.

7. A membrane diffusion apparatus for liquid gasification and dialysis comprising a stack of at least three different kinds of cells arranged in a set order wherein each two successive cells are of different kinds and wherein a first kind of cell and a second kind of cell are always separated from each other by a different kind of cell, said first kind of cell comprising membranes overlying both sides of first frame means, said second kind of cell comprising gas and liquid impermeable closure means overlying both sides of second frame means, manifold means in the periphery of all said cells and their frame means, membranes, and closure means for conducting independently a series of said separate fluids through said stack and for distributing them into said first, second, and other cells, said manifold means including a plurality of sets of fine comb-like elements providing unrestricted uniform flow of each said fluid to and from inner spaces of its cells, said stack being enclosed by two end clamping means, each including conduit means connecting said manifold means with inlet and outlet ports, each said fluid having an inlet port in one said end clamping means and an outlet port in the other said end clamping means, so that force from pressure of one said fluid, the fluid flowing through each said second cell, is directed against said closure means to generate a constant volume of uniform thickness in each said first cell enabling gently turbulent uniform flow of said first fluid and enabling uniform diffusion exchange between the fluid flowing through said first cell and another fluid, said stack and its cells, frame means, membranes, and closure means being symmetrical polygons with an even number of sides, opposite sides being parallel to each other, said manifold means comprising two said sets of fine come-like elements for each said fluid, one in each of two opposite sides and parallel to each other, one for the incoming fluid and the other for the outgoing fluid, in each said frame means, said manifold means also comprising slot means in said membrane and closure means, said comb-like elements in each said frame means of said stack coinciding with slot means in the other members of the stack to provide unrestricted and independent passage for each fluid.

8. The membrane diffusion apparatus of claim 7 wherein each said cell has in its frame means two said sets of comb-like elements, one set having a series of ingress channels and the other set having a series of egress channels for the slot means for its said fluid opening into a hollow central cell area, the fluid for that cell passing from its slot means for incoming fluid through the ingress channels across said central cell area and through the egress channels to its slot means for outgoing fluid, the interior edges of said frame means being parallel to assure uniform flow paths.

9. The membrane diffusion apparatus of claim 8, wherein each of said ingress channels and each of said egress channels flares out toward the inner edge of its said frame means to provide unthrottled flow of its fluid into its cell's hollow central area.

10. The membrane diffusion apparatus of claim 8, wherein each said slot means, other than those having channels, comprises a series of slots in line with each other.

11. The membrane diffusion apparatus of claim 7 wherein some sides have two said slot means per side, for different fluids.

12. A membrane diffusion apparatus adapted to dialysis and gasification of liquids comprising a stack of at least three different kinds of cells arranged in a set order wherein each two successive cells are of different kinds and wherein a first kind of cell and a second kind of cell are always separated from each other by a different kind of cell, said first kind of cell comprising membranes overlying both sides of first frame means, said second kind of cell comprising gas and liquid impermeable closure means overlying both sides of second frame means, manifold means in the periphery of all said cells and their frame means, membranes, and closure means for conducting independently a series of separate fluids through said stack and for distributing them into first, second, and other cells, each said frame means comprising a pair of identical frames, each having on one face a series of grooves for conveying one said fluid only from its manifold means into its cell, the frame faces having the grooves lying against each other, said stack being enclosed by two end clamping means, each including conduit means connecting said manifold means with inlet and outlet ports, each said fluid having an inlet port in one said end clamping means and an outlet port in the other said end clamping means, so that force from pressure of one said fluid, the fluid flowing through each said second cell, is directed against said closure means to generate a constant volume of uniform thickness in each said first cell enabling gently turbulent uniform flow of said first fluid, and enabling uniform diffusion exchange between the fluid flowing through said first cell and another fluid.

13. The membrane diffusion apparatus of claim 12 wherein the said grooves are inclined at an angle to the inner edges of the frames and the grooves of one frame are inclined oppositely to the inclinations of the grooves in the facing frame.

14. A membrane diffusion apparatus comprising a stack of at least three different kinds of cells arranged in a set order wherein each two successive cells are of different kinds and wherein a first kind of cell and a second kind of cell are always separated from each other by a different kind of cell, said first kind of cell comprising membranes overlying both sides of first frame means, said second kind of cell comprising gas and liquid impermeable closure means overlying both sides of second frame means, manifold means in the periphery of all said cells and their frame means, membranes, and closure means for conducting independently a series of separate fluids through said stack and for distributing them into first, second, and other cells, said manifold means including means providing unrestricted uniform flow of each said fluid to and from inner spaces of its cells, said stack being enclosed by two end clamping means, each including conduit means connecting said manifold means with inlet and outlet ports, each said fluid having an inlet port in one said end clamping means and an outlet port in the other said end clamping means, so that force from pressure of one said fluid, the fluid flowing through each said second cell, is directed against said closure means to generate a constant volume of uniform thickness in each said first cell enabling gently turbulent uniform flow of said first fluid, and enabling uniform diffusion exchange between the fluid flowing through said first cell and another fluid, and wherein said conduit means in said end clamping means taper from a larger cross-sectional area at the end communicating with a said port to a smaller cross-sectional area at the other end of said conduit.

15. A disposable membrane diffusion apparatus for liquid gasification and dialysis comprising a stack of first, second and third cells arranged in the order: third cell, second cell, first cell, second cell, third cell, second cell, first cell, and so on, said first cell comprising a membrane overlying both sides of first frame means, said second cell comprising second frame means, foraminous spacing means of uniform thickness interposed within each of said first and second frame means, said third cell comprising a gas and liquid impermeable closure means overlying both sides of third frame means, one of said frame means being inverted with respect to one of the other frame means, manifold means in the periphery of all said frames, membranes, and closure means for conducting independently first, second, and third fluids through said stack and for distributing them into first, second, and third cells, repectively, said manifold means providing unrestricted uniform flow of a selected said fluid to and from inner spaces of each of said frames, said stack being enclosed by two end clamping means, each including conduit means connecting said manifold means with inlet and outlet ports, each said fluid having an inlet port in one said end clamping means and an outlet port in the other said end clamping means, so that when force from pressure of said third fluid is directed against said closure means a constant volume of uniform thickness is generated in said first cell enabling gently turbulent uniform flow of said first fluid, and enabling uniform diffusion exchange with said second fluid.

16. An apparatus as defined by claim 15 wherein said frame means, membranes, closure means, and end clamping means are rectangular and said frames, membranes, and closure means are substantially identical in size and shape, each having two longer parallel sides and two shorter parallel sides.

17. An apparatus as defined by claim 16 wherein said manifold means comprises:

first slot means along nearly the full length of and parallel to the edge of each said longer side of each said frame means, membrane, and closure means of said stack, a series of many narrow, parallel, first channels extending out from said first slot means along the full length of each said first slot means of each said first frame means to and through the inner margin of said first frame means for passing said first fluid into and from each said first cell from and to respective said first slot means, second and third slot means of identical length in line with each other and each extending about one half of the length of each said shorter side parallel to the edge thereof of each said frame means, membrane, and closure means of said stack, the second slot means of one said shorter side being diagonally opposite the second slot means of the other said shorter side, and the third slot means of one said shorter side being diagonally opposite the third slot means of the other said shorter side, and a series of many narrow, parallel, second channels in each said second frame means extending from the diagonally opposite second slot means, said second frame means and said third frame means being identical except that one is inverted with respect to the other so that said second fluid passes into and from said second cells through said second channels, while said third fluid passes into and from said third cells through the inverted said second channels, said slot means of said frame means, membranes, and closure means coinciding when the stack of said cells is assembled to provide unrestricted and independent manifolds at the peripheral walls of said stack for the unimpeded and independent flow of said first, second, and third fluids therein.

18. An apparatus as defined by claim 17 wherein each of said first and second channels flares out near the inner edge of its said frame means to provide unthrottled flow of its fluid into the space lying within its cell.

19. An apparatus as defined by claim 17 wherein each said slot means comprises a series of slots in line with each other.

20. An apparatus as defined by claim 15 wherein said frame means, membranes, closure means, and end plate means are hexagonal, having two long parallel sides and four shorter parallel sides in diagonally opposite pairs.

21. An apparatus as defined by claim 20 wherein said manifold means comprises:

slot means along nearly the full length of and parallel to the edge of each side of each said frame means, membrane, and closure means of said stack, a series of many narrow first channels extending from the two said slot means of one said diagonally opposite pair of shorter sides and extending to and through the inner margin of each said first frame means, for passage of said first fluid into and from each said first cell, said first and second frame means being identical except for inversion of one relative to the other so that in said second frame means said first channels are located in the other pair of said diagonally opposite shorter sides for passage of said second fluid into and from each said second cell, a series of many narrow second channels extending from each of the said slot means that are located in said long parallel sides, extending to and through the inner margin of each said third frame means, for passage of said third fluid into and from each said third cell, said slot means of said frame means, membranes, and closure means coinciding when the stack of said cells is assembled to provide unrestricted and independent manifolds at the peripheral walls of said stack for the unimpeded and independent flow of said first, second, and third fluids therein.

22. An apparatus as defined by claim 21 wherein each of said first and second channels flares out near the inner edge of said frame means of its respective cell to provide unthrottled flow of its fluid into the space lying within that cell.

23. An apparatus as defined by claim 15 wherein each said frame means comprises a pair of spacer frames, and a main frame sandwiched between the spacer frames.

24. An apparatus as defined by claim 15 wherein each said frame means comprises a pair of identical frames, each having on one face a series of grooves for conveying one said fluid only from its manifold means into its cell, the frame faces having the grooves lying against each other.

25. An apparatus as defined by claim 24 wherein the said grooves are inclined at an angle to the inner edges of the frames and the grooves of one frame are inclined oppositely to the inclinations of the grooves in the facing frame.

26. An apparatus of claim 15 wherein said conduit means in said end clamping means taper from a larger cross-sectional area at the end communicating with a said port to a smaller cross-sectional area at the other end of said conduit.

27. An apparatus as defined in claim 15 wherein said end clamping means comprise a press and two plastic sheets substantially the same size as said stack and containing said conduits and ports, said plastic sheets with said stack forming a disposable assembly.

28. A membrane diffusion device for liquid gasification and dialysis providing independent paths for each of three fluids, comprising an assembly of cells held together by pressure means and including in combination:
  a first cell for a first said fluid having first frame means, internal foraminous spacing means inside said first fram means, and a pair of first membrane elements, one on each side of said first frame means, said first cell having inlet means for admitting said first fluid into the space within said first frame means and between said first membrane elements and outlet means for letting it flow out therefrom,
  an identical pair of second cells for a second said fluid, one said second cell being located on each side of said first cell and each comprising second frame means and internal foraminous spacing means inside said second frame means, said second cell having inlet means and outlet means for conducting said second fluid into and from said second cell, and
  an identical pair of third cells for said third fluid located externally to and on opposite sides of an assembly of one said first cell and two said second cells, and each comprising third frame means with second membrane elements on either side thereof and inlet means and outlet means for letting said third fluid into and out from said third cell,
  said inlet means and outlet means of at least one cell including a multiplicity of fine comb-like elements providing flow channels.

29. The membrane diffusion device of claim 28 in which all said frame means and all said membranes have six slot means comprising three pairs of slot means, the slot means in each pair being of equal size, shape and relative location on opposite sides and in matching locations in each cell, so that when the cells are assembled, these slot means form vertical manifolds,
said first frame means having many channels located along substantially the entire lengths of one said pair of slot means for flow of said first fluid into and out from said first cell,
said second and third frame means each having many transverse channels in diagonally opposite locations along one of the remaining pairs of slot means, one for said second fluid and one for said third fluid, each fluid having slot means and transverse channels specific to it.

30. The membrane diffusion device of claim 28 having a plurality of manifold recesses in said pressure means, which connect each said slot means with a port at one end of each said manifold recess.

31. A membrane diffusion apparatus for liquid gasification and dialysis comprising
  a stack of frames and membranous means which when sealingly compressed form a plurality of first, second, and third cells for circulating first, second, and third fluids through said apparatus,
  screen spacing means interposed within the open space of said frames of said first and second cells, said membranous means lying between said frames of said first and second cells and between the frames of said second and third cells,
  each said first cell being interposed between two said second cells and with a said third cell adjacent the outer surface of each said second cell,
  the sides of said frames and said membranous means incorporating a plurality of manifold means for transporting said first, second and third fluids independently, uniformly and unrestrictedly to and from said first, second and third cells, respectively, said third fluid within said third cells providing a force against said membranous means to define in said first cell a space of uniform thickness for uniform patterns of flow for said first fluid through said first cell, and
  means for providing inlet and outlet conduit communication with said manifold means while simultaneously providing said sealing compression.

32. A disposable membrane diffusion apparatus comprising
  frame means in combination with membranous means and screen spacer means defining a stack of cells for effecting the efficient diffusion exchange between a first and second fluid through a first said membranous means,
  said stack of cells made up of a plurality of cellular units, said units comprising a first cell for a first fluid sandwiched between second cells for a second fluid, successive said units being separated by a third cell for a third fluid,
  each said first cell comprising a said screen spacer means within a first said frame means sandwiched by first said membranous means, each said second cell comprising a said screen spacer means within a second said frame means adjacent to outer surfaces of said first cell, each said third cell comprising a said second frame means inverted with respect to the second said frame means in said second cells and sandwiched between a pair of second said membranous means, manifold means in the periphery of all said frame means and all said membranous means for conducting said first, second, and third fluids independently and freely to and from said first, second, and third cells, respectively, and conduit end plate means for connecting said manifold means with independent inlet and outlet means for each of said first, second, and third fluids, said end plate means providing sealing means for said stack of cells when in clamped arrangement with them, said third fluid providing compressive force against said first membranous means to create a constant volume of uniform thickness in said first cell, wherein said first fluid flows in a mildly turbulent manner to effect uniform diffusion exchange with said second fluid.

33. A membrane diffusion apparatus comprising a stack of first, second, third and fourth cells arranged in the order: first cell, second cell, third cell, fourth cell, first cell, and so on, said first cell comprising a gas and liquid impermeable closure means overlying both sides of first frame means, said second cell comprising second frame means, said third cell comprising first and second membranes, one overlying each side of third frame means, said fourth cell comprising fourth frame means, foraminous spacing means of uniform thickness interposed within each of said second, third, and fourth frame means, manifold means in the periphery of all said frame means, membranes, and closure means for conducting independently first, second, third, and fourth fluids through said stack and for distributing them into first, second, third, and fourth cells, respectively, said manifold means providing unrestricted uniform flow of a selected said fluid to and from inner spaces of each of said frames, said stack being enclosed by two end clamping means, each including conduit means connecting said manifold means with inlet and outlet ports, each said fluid having an inlet port in one said end clamping means and an outlet port in the other said end clamping means, so that when force from pressure of said first fluid is directed against said closure means a constant volume of uniform thickness is generated in said third cell enabling gently turbulent uniform flow of said third fluid, and enabling uniform diffusion exchange of said third fluid with said second fluid and uniform diffusion exchange of said third fluid with said fourth fluid.

34. The membrane diffusion apparatus of claim 33 wherein said third and fourth frame means are identical except that one is inverted relative to the other.

35. An apparatus as defined by claim 33 wherein said manifold means comprises:

eight slot means along and parallel to the edge of each said side of each said frame means, membrane, and closure means of said stack, there being two slot means for each fluid arranged in diagonally opposite pairs, a series of many parallel channels extending from one pair of said slot means in each said frame means, extending to and through the inner margin of each said frame means for passing the fluid for its cell into and from that cell, said slot means of said frame means, membranes, and closure means coinciding when the stack of said cells is assembled to provide unrestricted and independent manifolds at the peripheral walls of said stack for the unimpeded and independent flow of said first, second, third and fourth fluids therein.

36. An apparatus as defined by claim 35 wherein each of said channels flares out near the inner edge of its said frame means to provide unthrottled flow into the space lying within that cell.

37. A membrane diffusion device including in combination:

two manifold pressure plates, one for each end of said device, each comprising an identical member having a rectangular shape with conduit means extending longitudinally from one end to the other on each longitudinal margin and conduit means extending less than halfway across each side of each end portion, said member having port means for one said longitudinal conduit and for two of the end conduit means, a plurality of water cells, exchange fluid cells, and blood cells, each made from individual flexible plastic members and alternating in the general order of water cell, exchange fluid cell, blood cell, exchange fluid cell, water cell, exchange fluid cell, blood cell, exchange fluid cell, water cell, exchange fluid cell, and so on, each said water cell comprising at each end a water cell membrane, a spacer frame adjacent each said water cell membrane and a water frame sandwiched between the two said spacer frames, each said exchange fluid cell comprising a spacer frame at each end, with an exchange fluid frame and an exchange fluid screen between them, each said blood cell comprising a blood cell membrane at each end, a spacer frame next to each said blood cell membrane and a blood frame and blood screen between said spacer frames, each said water cell membrane and each said blood cell membrane being a rectangular plastic member identical in area and shape, and having a row of longitudinal slots along the full length near each longitudinal edge to concide in location with the conduits on the manifold pressure plates, and a line of widthwise-extending slots along the widthwise margin coinciding with the end conduits of the manifold plates, said water cell membrane being both water- and oxygenimpermeable plastic, said blood cell membrane being a plastic that is blood-impermeable but oxygen- and carbon dioxide-permeable, all said spacer frames being rectangular and identical in all cells, each said spacer frame being plastic and having two longitudinal frame portions and two end frame portions, said longitudinal frame portions being provided with slots corresponding in size and location to those on said water cell membrane and said end members having slots corresponding in size and location to those on said water cell membrane, said water frame and said exchange fluid frame being rectangular and identical except that one is turned over 180° relative to the other, each one being plastic and symmetric along its diagonal axis and having slots along the longitudinal margin corresponding with those of said spacer frame and diagonally opposite slots on one half of each end portion coinciding with half of those on said spacer frame, and many narrow transverse channels on the other half of each said end portion providing entry and exit from said water and exchange fluid frames into and from the interior of the respective cell, the water frame having its channels on one half of each end portion and the exchange fluid cells having them on the other half, each said blood frame being plastic and rectangular and having slots corresponding in size and location to those of said spacer frames at each end and having along each longitudinal portion many said narrow channels leading into and from the interior of the blood cells, said exchange fluid screen and blood screen being identical members which lie within their respective exchange fluid frame or blood frame and substantially fill the open portion thereof to provide means holding apart said blood cell membranes and water cell membranes to prevent closure of these cells.

38. A membrane-type lung including in combination:

two manifold pressure plates, one for each end of the lung, each comprising an identical member having a rectangular shape with conduit means extending longitudinally from one end to the other on each longitudinal margin and lateral conduit means extending less than halfway across each side of each end portion, said member having port means for one said longitudinal conduit means and for two of said lateral conduit means, a plurality of water cells, oxygen cells, and blood cells, each made from individual flexible plastic members and alternating in the general order of water cell, oxygen cell, blood cell, oxygen cell, water cell, oxygen cell, blood cell, oxygen cell, water cell, oxygen cell, and so on, each said water cell comprising at each end a gas- and water-impervious membrane, a spacer frame adjacent each said membrane, and a water frame sandwiched between the two spacer frames, each said oxygen cell comprising a spacer frame at each end, with an oxygen frame and an oxygen screen between them, each said blood cell comprising a gas-pervious, liquid-impervious membrane at each end, a spacer frame next to each gas-pervious membrane and a blood frame and blood screen between said spacer frames, each said membrane being a rectangular plastic member identical in area and shape, and having a row of longitudinal slots along the full length near each longitudinal edge to coincide in location with the conduits on the manifold pressure plates, and a line of widthwise extending slots along the widthwise margin coinciding with the lateral conduits of the manifold plates, all said spacer frames being rectangular and identical in all cells, each said spacer frame being plastic and having two longitudinal frame portions and two end frame portions, said longitudinal frame portions being provided with slots corresponding to those on said membranes and said end members having slots corresponding to those on said membranes, said water frame and said oxygen frame being rectangular and identical except that one is turned over 180° relative to the other, each one being plastic and symmetric along its diagonal axis and having slots along the longitudinal margin corresponding with those of said spacer frames, and diagonally opposite slots on one half of each end portion coinciding with half of those on said spacer frame, and many narrow transverse channels on the other half of each said end portion providing entry and exit from said water and oxygen frames into and from the interior of the respective cell, the water frame having its slots on one half of each end portion and the oxygen cells having them on the other half, each said blood frame being plastic and rectangular and having slots corresponding to those of said spacer frames at each end and having along each longitudinal portion said slots and many said narrow channels leading into and from the interior of the blood cell, said oxygen screen and blood screen being identical members which lie within their respective oxygen frame or blood frame and substantially fill the open portion thereof to provide means holding apart the membranes to prevent closure of these cells.

* * * * *

UNITED STATES PATENT OFFICE
CERTIFICATE OF CORRECTION

Patent No. 3,834,544              Dated September 10, 1974

Inventor(s) William H. Tyson, Jr. and Mogens L. Bramson

It is certified that error appears in the above-identified patent and that said Letters Patent are hereby corrected as shown below:

Item [57] Abstract, line 9, "shaped" should read --shapes--.
Column 1, line 60, "for" should read --For--.
Column 3, line 19, "pressuring" should read --pressurizing--.
Column 4, line 4, "a isometric" should read --an isometric--.
Column 5, line 14, "oxygen inlet 27" should read
              --oxygen outlet 27--.
Column 7, line 16, "carrier 54" should read --barrier 54--.
Column 7, line 33, "member 62" should read --member 63--.
Column 9, line 38, "53" should read --63--.
Column 14, line 6, "Th" should read --The--.
Column 16, line 12, "appratus" should read --apparatus--.
Column 17, line 27, "come-like" should read --comb-like--.
Column 18, line 39, "membrance" should read --membrane--.
Column 19, line 31, "repectively" should read --respectively--.
Column 21, line 41, "fram" should read --frame--.
Column 22, line 8, "many channels" should read
              --many transverse channels--.
Column 23, line 26, after "apparatus" insert
              --for liquid gasification and dialysis--.
Column 24, line 62, "ygenimpermeable" should read
              --ygen-impermeable--.
Column 25, line 27, "cells" should read --cell--.

Signed and sealed this 14th day of January 1975.

(SEAL)
Attest:

McCOY M. GIBSON JR.                C. MARSHALL DANN
   Attesting Officer                  Commissioner of Patents